US011756030B2

(12) United States Patent
Gonzales, Jr.

(10) Patent No.: US 11,756,030 B2
(45) Date of Patent: *Sep. 12, 2023

(54) SECURE MANAGEMENT OF CONTENT DISTRIBUTION DATA BLOCKS ON A BLOCKCHAIN

(71) Applicant: eBay Inc., San Jose, CA (US)

(72) Inventor: Sergio Pinzon Gonzales, Jr., San Jose, CA (US)

(73) Assignee: eBay Inc., San Jose, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 17/190,846

(22) Filed: Mar. 3, 2021

(65) Prior Publication Data

US 2021/0201305 A1    Jul. 1, 2021

Related U.S. Application Data

(63) Continuation of application No. 16/041,680, filed on Jul. 20, 2018, now Pat. No. 10,977,647.

(Continued)

(51) Int. Cl.
*H04L 9/32* (2006.01)
*G06F 21/62* (2013.01)
(Continued)

(52) U.S. Cl.
CPC ........... *G06Q 20/389* (2013.01); *G06F 21/10* (2013.01); *G06F 21/30* (2013.01); *G06F 21/602* (2013.01);
(Continued)

(58) Field of Classification Search
CPC ........ G06F 21/62; G06F 21/10; G06F 21/602; G06F 21/30; G06F 21/6245;
(Continued)

(56) References Cited

U.S. PATENT DOCUMENTS 9,635,000 B1    4/2017  Muftic
9,641,342 B2    5/2017  Sriram et al.
(Continued)

FOREIGN PATENT DOCUMENTS

CN    107077682 A    8/2017
CN    107086909 A    8/2017
(Continued)

OTHER PUBLICATIONS

U.S. Appl. No. 16/041,680, filed Jul. 20, 2018, Issued.
(Continued)

*Primary Examiner* — Frantz B Jean
(74) *Attorney, Agent, or Firm* — SHOOK, HARDY & BACON LLP

(57) ABSTRACT

Technologies are shown for content distribution on a blockchain involving generating a content distribution data block on a content distribution data blockchain, that stores digital content, data identifying the digital content, an owner identifier, an access holder identifier, and a use conditions attribute for identifying use requirements for the digital content. A use requirement is defined in the use conditions attribute. An owner identified in the owner identifier sets the access holder identifier to an identifier for a user entity. An access request is received from the user entity and, in response, whether a current use condition of the user entity satisfies the use requirement in the use conditions attribute is verified. If it is verified that the current use condition of the user entity satisfies the use requirement in the use conditions attribute, the digital content is distributed to the first user entity.

20 Claims, 16 Drawing Sheets

Related U.S. Application Data

(60) Provisional application No. 62/612,091, filed on Dec. 29, 2017.

(51) Int. Cl.

| | | |
|---|---|---|
| G06F 21/10 | (2013.01) | |
| G06Q 20/38 | (2012.01) | |
| H04L 65/612 | (2022.01) | |
| H04L 67/53 | (2022.01) | |
| H04L 67/63 | (2022.01) | |
| G06Q 20/40 | (2012.01) | |
| G06Q 20/08 | (2012.01) | |
| G06Q 40/08 | (2012.01) | |
| G06F 21/30 | (2013.01) | |
| H04L 9/06 | (2006.01) | |
| G06Q 20/42 | (2012.01) | |
| G06Q 30/018 | (2023.01) | |
| G06F 21/60 | (2013.01) | |
| H04L 9/30 | (2006.01) | |
| H04L 9/40 | (2022.01) | |
| G06F 21/64 | (2013.01) | |
| H04L 9/00 | (2022.01) | |
| H04L 67/52 | (2022.01) | |
| G06F 16/27 | (2019.01) | |
| G06F 16/18 | (2019.01) | |

(52) U.S. Cl.
CPC .......... *G06F 21/62* (2013.01); *G06F 21/6218* (2013.01); *G06F 21/6245* (2013.01); *G06Q 20/0855* (2013.01); *G06Q 20/3825* (2013.01); *G06Q 20/3829* (2013.01); *G06Q 20/401* (2013.01); *G06Q 20/42* (2013.01); *G06Q 30/018* (2013.01); *G06Q 40/08* (2013.01); *H04L 9/0637* (2013.01); *H04L 9/0643* (2013.01); *H04L 9/30* (2013.01); *H04L 9/3236* (2013.01); *H04L 9/3239* (2013.01); *H04L 9/3247* (2013.01); *H04L 9/3297* (2013.01); *H04L 63/102* (2013.01); *H04L 63/12* (2013.01); *H04L 65/612* (2022.05); *H04L 67/53* (2022.05); *H04L 67/63* (2022.05); *G06F 16/1805* (2019.01); *G06F 16/27* (2019.01); *G06F 21/645* (2013.01); *G06F 2221/2107* (2013.01); *H04L 9/50* (2022.05); *H04L 67/52* (2022.05); *H04L 2209/56* (2013.01)

(58) Field of Classification Search
CPC ......... G06F 21/6218; G06F 2221/2107; G06F 16/1805; G06F 21/645; G06F 16/27; H04L 9/3239; H04L 63/12; H04L 67/53; H04L 9/3297; H04L 9/3247; H04L 9/3236; H04L 63/102; H04L 65/612; H04L 9/0637; H04L 9/30; H04L 67/63; H04L 9/0643; H04L 67/52; H04L 9/50; H04L 2209/56; G06Q 20/42; G06Q 20/3829; G06Q 20/401; G06Q 30/018; G06Q 20/0855; G06Q 20/389; G06Q 20/3825; G06Q 40/08
See application file for complete search history.

(56) References Cited

U.S. PATENT DOCUMENTS

| | | |
|---|---|---|
| 9,680,799 B2 | 6/2017 | Iyer et al. |
| 9,722,790 B2 | 8/2017 | Ebrahimi |
| 9,749,140 B2 | 8/2017 | Oberhauser et al. |
| 9,774,578 B1 | 9/2017 | Ateniese et al. |
| 10,977,647 B2 | 4/2021 | Gonzales, Jr. |
| 2004/0024688 A1 | 2/2004 | Bi et al. |
| 2006/0100965 A1 | 5/2006 | Simelius |
| 2013/0174272 A1 | 7/2013 | Chevalier et al. |
| 2013/0219458 A1 | 8/2013 | Ramanathan |
| 2015/0332283 A1 | 11/2015 | Witchey |
| 2016/0028552 A1 | 1/2016 | Spanos et al. |
| 2016/0203572 A1 | 7/2016 | Mcconaghy et al. |
| 2016/0283941 A1* | 9/2016 | Andrade ............ G06Q 20/3829 |
| 2016/0300234 A1 | 10/2016 | Moss-Pultz et al. |
| 2016/0330034 A1 | 11/2016 | Back et al. |
| 2016/0342976 A1 | 11/2016 | Davis |
| 2016/0342977 A1 | 11/2016 | Lam |
| 2016/0379212 A1 | 12/2016 | Bowman et al. |
| 2017/0005804 A1 | 1/2017 | Zinder |
| 2017/0011460 A1 | 1/2017 | Molinari et al. |
| 2017/0046664 A1 | 2/2017 | Haldenby et al. |
| 2017/0103390 A1 | 4/2017 | Wilson et al. |
| 2017/0109735 A1 | 4/2017 | Sheng et al. |
| 2017/0132626 A1 | 5/2017 | Kennedy |
| 2017/0132630 A1 | 5/2017 | Castinado et al. |
| 2017/0149560 A1* | 5/2017 | Shah ..................... G06K 7/1417 |
| 2017/0177898 A1* | 6/2017 | Dillenberger ....... G06F 21/6227 |
| 2017/0232300 A1 | 8/2017 | Tran et al. |
| 2017/0243193 A1 | 8/2017 | Manian et al. |
| 2017/0308872 A1 | 10/2017 | Uhr et al. |
| 2017/0329980 A1 | 11/2017 | Hu et al. |
| 2017/0331810 A1 | 11/2017 | Kurian |
| 2017/0337534 A1 | 11/2017 | Goeringer et al. |
| 2018/0018723 A1 | 1/2018 | Nagla et al. |
| 2018/0025442 A1 | 1/2018 | Isaacson et al. |
| 2018/0060496 A1 | 3/2018 | Bulleit et al. |
| 2019/0205563 A1 | 7/2019 | Gonzales, Jr. |
| 2019/0207995 A1 | 7/2019 | Gonzales, Jr. |
| 2019/0334724 A1* | 10/2019 | Anton ....................... H04L 9/50 |
| 2020/0027096 A1* | 1/2020 | Coon ..................... G06Q 40/04 |
| 2022/0309511 A1* | 9/2022 | Metnick ............. G06Q 20/3825 |

FOREIGN PATENT DOCUMENTS

| | | |
|---|---|---|
| WO | 2017/066002 A1 | 4/2017 |
| WO | 2017/098519 A1 | 6/2017 |
| WO | 2017/145047 A1 | 8/2017 |
| WO | 2017/148245 A1 | 9/2017 |
| WO | 2017/163069 A1 | 9/2017 |
| WO | 2017/163220 A1 | 9/2017 |
| WO | 2017/178956 A1 | 10/2017 |
| WO | 2017/182601 A1 | 10/2017 |
| WO | 2017/195160 A1 | 11/2017 |
| WO | 2017/196701 A1 | 11/2017 |
| WO | 2019/133308 A1 | 7/2019 |
| WO | 2019/133309 A1 | 7/2019 |

OTHER PUBLICATIONS

Non Final Office Action received for U.S. Appl. No. 16/020,975, dated Sep. 10, 2021, 13 pages.
"Ethereum Wallets are Enabling Transaction Scheduling, Killer Feature," Ethereum News, Retrieved from the Internet URL: <https://www.ccn.com/ethereum-wallets-are-enabling-transaction-scheduling-killer-feature/>, Sep. 18, 2018, 6 pages.
"The Alarm Service Is Now Available On The Testnet," Retrieved from the Internet URL: <http://blog.ethereum-alarm-clock.com/blog/2016/1/16/the-alarm-service-is-now-available-on-the-testnet>, Jan. 16, 2016, 2 pages.
International Written Opinion received for PCT Application No. PCT/US2018/065852, dated Feb. 19, 2019, 6 pages.
Final Office Action Received for U.S. Appl. No. 16/020,975, dated Sep. 30, 2020, 13 pages.
Non-Final Office Action received for U.S. Appl. No. 16/020,975, dated Feb. 28, 2020, 12 pages.
International Preliminary Report on Patentability received for PCT Application No. PCT/US2018/065854, dated Jul. 9, 2020, 8 pages.
International Search Report received for PCT Application No. PCT/US2018/065854, dated Feb. 21, 2019, 3 pages.
Written Opinion received for PCT Patent Application No. PCT/US2018/065854, dated Feb. 21, 2019, 6 pages.

(56) References Cited

OTHER PUBLICATIONS

Steichen et al., "Blockchain-Based, Decentralized Access Control for IPFS", Retrieved from the Internet URL: <https://www.researchgate.net/publication/327034734>, Jul. 2018, 9 pages.
International Search Report received for PCT Application No. PCT/US2018/065852, dated Feb. 19, 2019, 4 pages.
Ethereum, "blockchain—How can a contract run itself at a later time?", Retrieved from the Internet URL:<https://ethereum.stackexchange.com/questions/42/how-can-a-contract-run-itself-at-a-later-time>, Accessed on Sep. 24, 2018, 12 pages.
Kishigami et al., "The Blockchain-Based Digital Content Distribution System", IEEE Fifth International Conference on Big Data and Cloud Computing, Aug. 1, 2015, pp. 187-190.
International Preliminary Report on Patentability Received for PCT Application No. PCT/US2018/065852, dated Jul. 9, 2020, 8 pages.
Advisory Action Received for U.S. Appl. No. 16/020,975, dated Dec. 31, 2020, 2 pages.
Non-Final Office Action Received for U.S. Appl. No. 16/041,680, dated Feb. 26, 2020, 10 pages.
Corrected Notice of Allowability received for U.S. Appl. No. 16/041,680, dated Jul. 8, 2020, 2 pages.
Notice Of Allowance received for U.S. Appl. No. 16/041,680, dated Sep. 18, 2020, 8 pages.
Notice Of Allowance received for U.S. Appl. No. 16/041,680, dated Jun. 10, 2020, 8 pages.
Notice of Allowance received for U.S. Appl. No. 16/041,680, dated Dec. 9, 2020, 7 Pages.
Notice of Allowance Received for U.S. Appl. No. 16/020,975, dated Aug. 31, 2022, 7 pages.
Non Final Office Action received for U.S. Appl. No. 18/083,327, dated Jun. 8, 2023, 12 pages.

\* cited by examiner

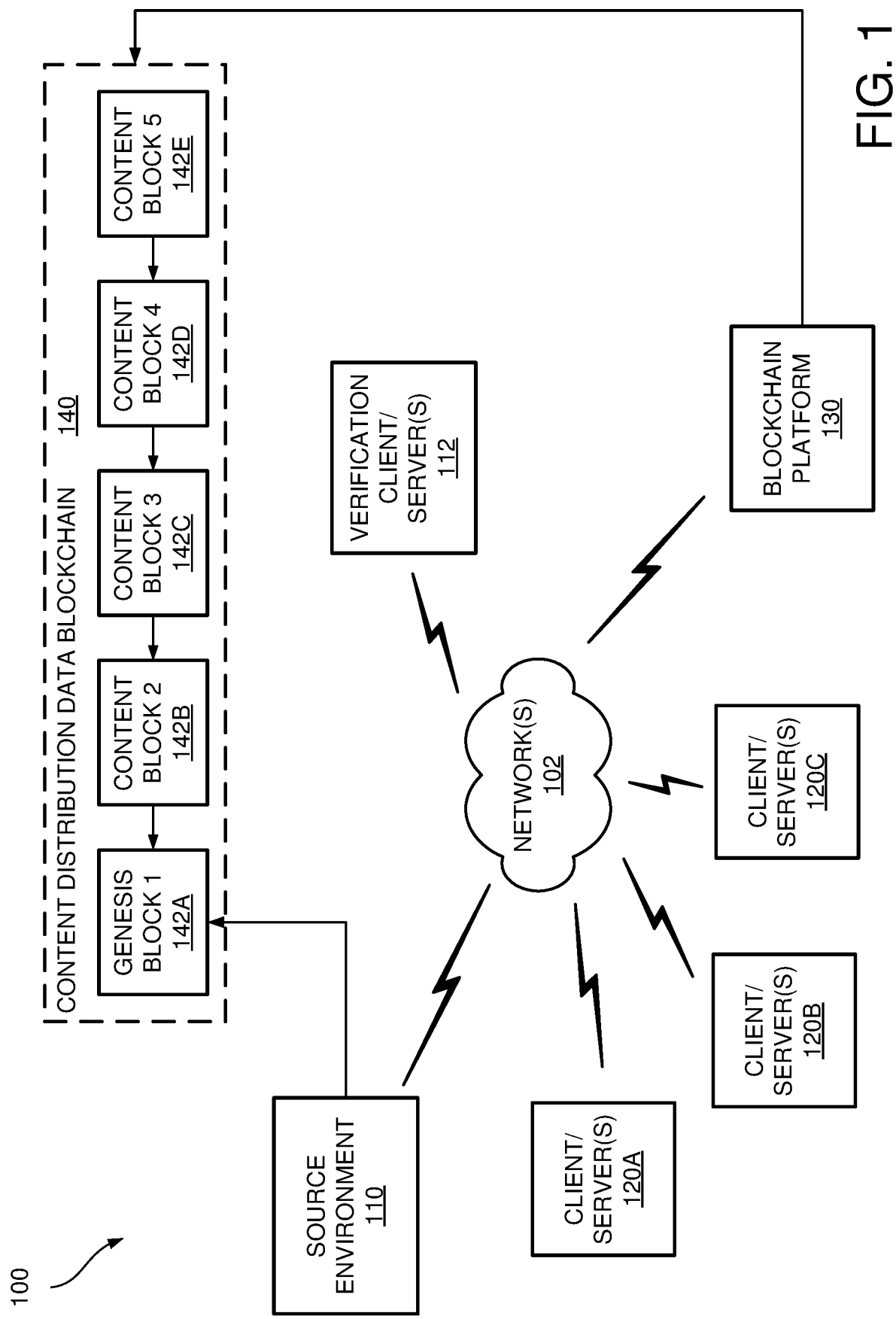

242

SOURCE ENVIRONMENT CREATES LIMITED USE BLOCK ON BLOCKCHAIN WITH SOURCE AS OWNER AND HOLDER, CONTROLLED CONTENT INCLUDED, AND USE CONDITIONS DEFINED
320

CONTENT DATA BLOCK STATE 322 distributionID(X)
content(FILE1)
owner(SOURCE)
holder (SOURCE)
3d_pty(TRUE)
use_cond[A, B, C]
state[# of uses/users]

CONTENT DATA BLOCK     324

METHODS

Distribution(String distributionID, use_conds[n], user) /* Called by source entity to enable access by user */
{
if(caller == distributionID.owner)
    distributionID.holder = user
    distributionID.use_cond[n] = use_conds[n] /* Set allowed uses */
}

Access(distributionID, current_use) /* Called by user to access controlled content */
{
if (caller == distribution[id].holder)
    if Verify(distributionID, caller, current_use) == true
        Update(distribution[id].state)
        Distribute(distribution[id].content, caller)

Verify(distributionID, user, current_use) /* Verify current use is allowed use condition */
{
if (distribution[id].3d_pty == true) /* Third party verifies */
    return(3dPtyVerify(distributionID, user, current_use))
else
    if(current_use == distributionID.use_cond[n])
        return(true)
    else
        return(false)
}

FIG. 3B

SECURE MANAGEMENT OF CONTENT DISTRIBUTION DATA BLOCKS ON A BLOCKCHAIN

CROSS REFERENCE TO RELATED APPLICATIONS

This application is a continuation of U.S. patent application Ser. No. 16/041,680, filed Jul. 20, 2018, issued as U.S. Pat. No. 10,977,647, entitled "SECURE MANAGEMENT OF CONTENT DISTRIBUTION DATE BLOCKS ON A BLOCKCHAIN," which claims the benefit of U.S. Provisional Patent Appl. No. 62/612,091, filed Dec. 29, 2017, entitled "Enhanced Distributed Database and Data Communications Operations", both of which are incorporated herein by reference in their entirety for all purposes.

BACKGROUND

In the context of distribution of digital content, it is sometimes advantageous for a source of digital content or service (inclusive of software, audio, photos, images, text and video) to limit or control access to the content or service based on various use parameters such as the number of uses, geography, number of users having access, device restrictions, demographics, etc.

Conventional e-commerce, e-tailing, digital media distribution and broadcast platforms can be deficient for automatically attaching restrictions of use to digital content or service on devices, locations, and/or users that are not controlled/attached to the source platform. Currently, content distribution platforms rely on expressing such restrictions on a confirmed/controlled device (e.g., a cable provider allowing a subscriber to play a movie for a period of 48 hours through control of the connected cable box).

It is with respect to these and other considerations that the disclosure made herein is presented.

SUMMARY

Technologies are disclosed herein for securely controlling distribution or access for digital content or services using a blockchain, where a source of the digital content or services can transfer access rights to digital content stored on a blockchain to a transferee and define the parameters of use of the digital content by the transferee.

A content distribution data blockchain can be established by an originator or source of digital content, such as digital audio, video, photographs, images, text or a streaming service for digital video, photographs, images, or text. Alternatively, content data blocks can be generated the source and linked to an existing blockchain, such as the ETHERIUM blockchain.

The source generates a content data block that includes the digital content and includes methods for accessing the digital content. The content data block can also include one or more required uses define by the source for the digital content, such as a particular user or transferee, a number of uses, a number of users, a geographical limit on use, or a device limitation on use.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 1 is an architectural diagram showing an illustrative example of a system for a content distribution data blockchain;

FIG. 3B is a data architecture diagram showing an illustrative example of a content distribution data block on a content distribution data blockchain that includes code for methods for controlling distribution of digital content maintained on the content distribution data blockchain;

DETAILED DESCRIPTION

Figure 2A:
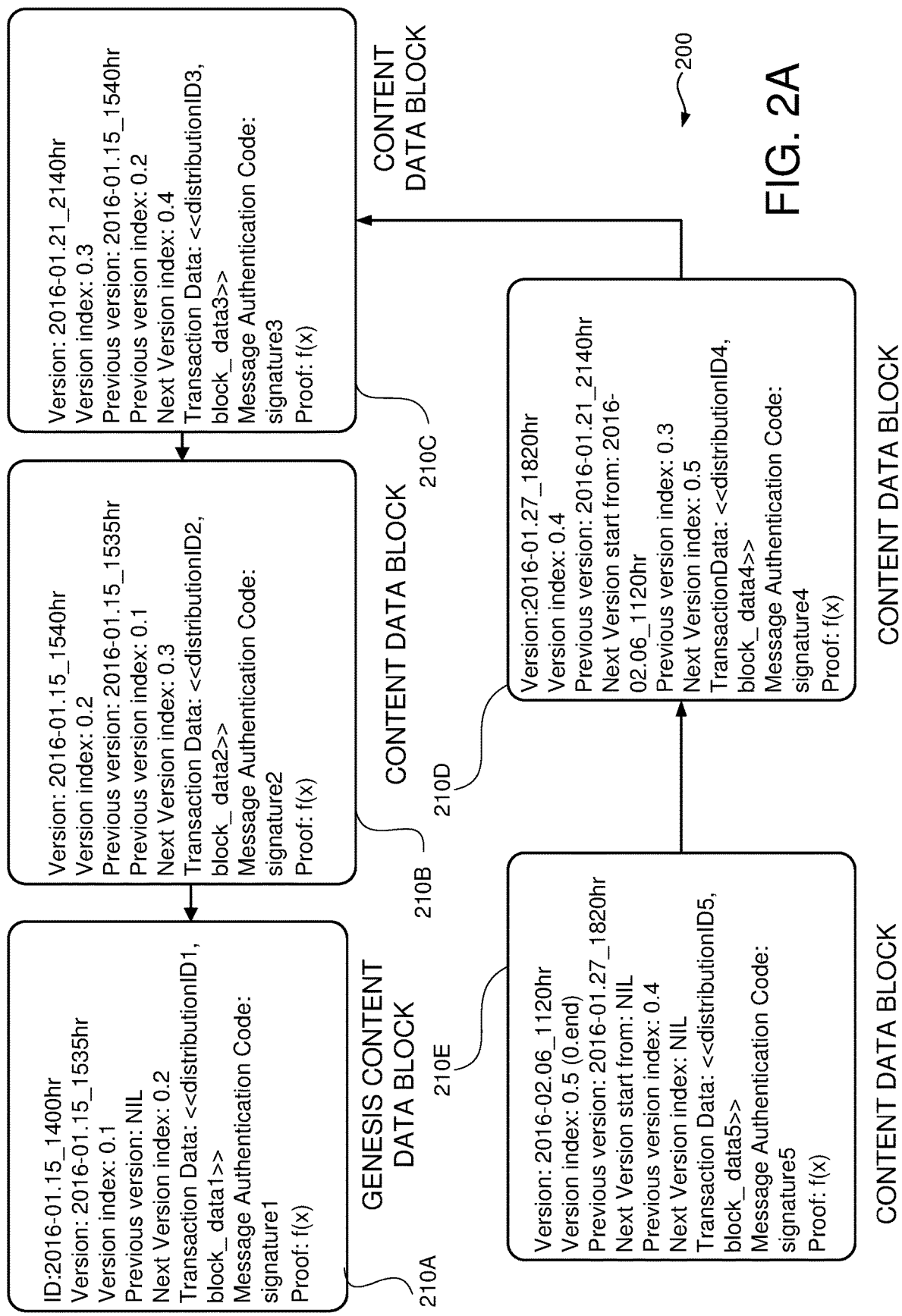
FIG. 2A is a data architecture diagram showing an illustrative example of a content distribution data blockchain securing digital content in content distribution data blocks on the blockchain.

In the context of distribution of digital content, it is sometimes advantageous for a source of digital content or service (inclusive of software, audio, photos, images, text and video) to limit or control access to the content or service based on various use parameters such as the number of uses, geography, number of users having access, device restrictions, demographics, etc.

The disclosed technology utilizes a blockchain smart contract that includes therein selected restrictions for the use of particular digital content or service. With the use of blockchain smart contracts having use restrictions, such as time, place, duration, or users, sources of such products can more efficiently and effectively control the delivery of their digital content.

The following Detailed Description describes technologies for securely controlling distribution or access for digital content or services using a blockchain, where a source of the digital content or services can transfer access rights to digital content stored on a blockchain to a transferee and define the parameters of use of the digital content by the transferee.

A content distribution data blockchain can be established by an originator or source of digital content, such as digital audio, video, photographs, images or text or a streaming service for digital audio, video, photographs, images or text. Alternatively, content data blocks can be generated the source and linked to an existing blockchain, such as the ETHERIUM blockchain.

The source generates a content data block that includes the digital content and includes methods for accessing the digital content. The content data block can also include one or more required uses define by the source for the digital content, such as a particular user or transferee, a number of uses, a number of users, a geographical limit on use, or a device limitation on use. In some examples, the source can define the required uses when the block is transferred.

The digital content in a content data block can be encrypted so that it can only be accessed through the methods of the block. Other content in the block, such as the methods or the holder identifier, can also be encrypted to prevent unauthorized access to the content. For example, the digital content and holder can be encrypted using a public-private key pair, where a public key for the source is used to encrypt data and a corresponding private key is used to decrypt data.

A technical advantage of the disclosed digital content distribution technology includes securely maintaining the digital content on a blockchain that can be widely accessed through the internet. Another technical advantage of the disclosed content distribution data technology is the distributed nature of the blockchain, which prevents an unauthorized entity from modifying or corrupting the digital content at any single point.

Conventionally, digital content distribution and broadcast platforms can be deficient for automatically attaching restrictions of use to digital content or service on devices, locations, and/or users that are not controlled/attached to the source platform. Currently, content distribution platforms typically rely on expressing such restrictions on a confirmed or controlled device (e.g., a cable provider allowing a subscriber to play a movie for a period of 48 hours through control of the connected cable box).

In certain simplified examples of the disclosed technologies, a method, system or computer readable medium for controlling distribution of digital content on a blockchain is shown involving generating a content distribution data block on a content distribution data blockchain, the content distribution data block storing a digital content, data identifying the digital content, an owner identifier for identifying an owner of the digital content, an access holder identifier for identifying at least one user entity having access to the digital content, and a use conditions attribute for identifying use requirements for the digital content. A use requirement is defined in the use conditions attribute. An owner entity identified in the owner identifier of the content distribution data block sets the access holder identifier to an identifier for a user entity. An access request is received from the user entity and, in response, it is verified whether a current use condition of the user entity satisfies the use requirement in the use conditions attribute. If it is verified that the current use condition of the user entity satisfies the use requirement in the use conditions attribute, distributing the digital content to the first user entity.

In some examples, the first content distribution data block includes a third party verification indicator for indicating that third party verification is required and the use requirement defined in the use conditions attribute corresponds to information to be obtained from a third party verification entity. The step of verifying whether a current use condition of the user entity satisfies the use requirement in the use conditions attribute involves, if the third party verification indicator indicates that third party verification is required, verifying whether the current use condition of the user entity satisfies the use requirement in the use conditions attribute utilizing the third party verification entity.

In other examples, the step of verifying whether the current use condition of the user entity satisfies the use requirement in the use conditions attribute utilizing the third party verification entity involves obtaining from the third party verification entity information corresponding to the current use condition of the user entity and verifying whether the information corresponding to the current use condition of the user entity the satisfies the use requirement in the use conditions attribute.

In still other examples, the step of verifying whether the current use condition of the user entity satisfies the use requirement in the use conditions attribute utilizing the third party verification entity involves verifying by the third party verification entity whether the current use condition of the user entity satisfies the use requirement in the use conditions attribute.

In certain examples, multiple use requirements are defined in the use conditions attribute and the current use condition of the user entity involves multiple current use conditions. The step of verifying whether a current use condition of first user entity satisfies the use requirement in the use conditions attribute involves verifying that the multiple current use conditions of the user entity satisfy the multiple use requirements defined in the use conditions attribute.

In yet other examples, the use requirement defined in the use conditions attribute and the current use condition of the user entity pertain to time, time duration, date, geographic location, virtual location, device type, a number of accesses to the digital content, and a number of users who have accessed the digital content. And in some examples, the digital content includes one or more of audio content, image content, video content, text content, an audio streaming service, an image streaming service, a text streaming service, and a video streaming service.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, a blockchain is used for controlling distribution of digital content stored on the blockchain. In a content distribution data blockchain, content data blocks securely store digital content in a manner that provides wide access to the digital content so that the digital content can be readily accessed by users with network access to the blockchain. The content data blocks also store definitions for one or more required uses that are defined by a source of the digital content to provide the source with effective control over the use of the digital content. For increased transparency, code for controlling access to the digital content can be included in the content distribution data blocks Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for a content distribution data blockchain ledger will be described. As will be described in more detail below with respect to the figures, there are a number of applications and services that may embody the functionality and techniques described herein.

FIG. 1 is an architectural diagram showing an illustrative example of a content distribution system 100 utilizing a content distribution data blockchain 140. A content distribution data blockchain can be utilized to securely maintain digital content and control access to the digital content. In the embodiment of FIG. 1, blockchain 140 can be a publicly available blockchain that supports scripting, such the ETHEREUM blockchain, which supports a SOLIDIFY scripting language, or BITCOIN, which supports a scripting language called SCRIPT.

A source environment 110, such as a client device, one or more servers, or remote computing resources, is controlled by a source entity that creates the digital content, such as a digital audio, video, photograph, image or text file, and wishes to distribute the digital content and maintain some control over the use of the digital content. In one example, source environment 110 initiates content distribution data blockchain 140 by creating genesis block 142A. For a content distribution data blockchain, genesis data block 142A, in this example, can include digital content for distribution along with information identifying the owner of the block, e.g. the source, a holder of the block, e.g. a user with access rights, and definitions for required uses of the digital content, e.g. time, place, duration, device, etc. In other examples, the source environment 110 creates content data blocks 142 that are linked to an existing blockchain.

In some embodiments, the source environment 110 can be replaced by another computing node, such as a computer on a peer-to-peer network, or other computing device.

In the example of FIG. 1, the digital content is provided by source environment 110 and secured on content distribution data blockchain 140. The information in the data blocks 142 of the blockchain can be made accessible to other entities, such as client/servers 120A, 120B or 120C or blockchain platform 130. In this example, the client/servers 120 can communicate with source environment 110 as well as a network of servers for blockchain platform 130 that supports and maintains blockchain 140. For example, the ETHERIUM blockchain platform from the ETHERIUM FOUNDATION of Switzerland provides a decentralized, distributed computing platform and operating system that provides scripting functionality.

In one example, source environment 110 owns and controls the content data blocks 142 in content distribution data blockchain 140. Each content data block 142 includes digital content to be distributed along with required uses defined by the source entity using source environment 110. The content data blocks 142 can, in some examples, also maintain use state data, such as a number of times that the digital content has been accessed.

Although source environment 110, at least initially, maintains control over the digital content, the content distribution data blockchain 140 can be made accessible to other entities, such as client/servers 120, so these entities can access digital content stored in the blocks in the blockchain. For example, content distribution data blockchain 140 may be viewable to the public through the use of applications that can access blockchain information. By providing access to the content distribution data blockchain 140, this approach allows users to readily access digital content maintained on the content distribution data blockchain 140 under the control of the digital content owner, e.g. the user of source environment 110.

In another example, aspects of the content distribution data blockchain 140 may be restricted to being viewable only to entities that are authorized to access the blockchain 140, such as source environment 110 or verification client/server(s) 112. By restricting access to the blockchain 140, a source entity can preserve greater control or security over the digital content.

FIG. 2A is a data architecture diagram illustrating a simplified example of a content distribution data blockchain ledger 200 based on the blocks 142A-E of the content distribution data blockchain ledger 140 of FIG. 1. The content distribution data blockchain ledger 200 example of FIG. 2A is simplified to show block headers, metadata and signatures of blocks 210A-E in order to demonstrate storage of digital content using a blockchain. In outline, a blockchain ledger may be a globally shared transactional database. Signatures can, in some examples, involve all or part of the data stored in the data the blocks 142A-E and can also involve public key addresses corresponding to entities involved in the distribution, e.g. a source entity, a transferee entity, or a verification entity.

The blockchain ledger 200 may be arranged as a Merkle tree data structure, as a linked list, or as any similar data structure that allows for cryptographic integrity. The blockchain ledger 200 allows for verification that the digital content and associated data has not been corrupted or tampered with because any attempt to tamper will change a Message Authentication Code (or has) of a block, and other blocks pointing to that block will be out of correspondence. In one embodiment of FIG. 2A, each block may point to another block. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of content distribution data blockchain 200 in the example of FIG. 2A shows securing digital content with a new content data block on the blockchain. In one example, source environment 110 of FIG. 1 provides the digital content and data identifying the an owner of the digital content, a holder with access to the digital content, required uses, and an indicator of whether third party verification is required when it creates genesis data block 210A. The source environment 110 signs the genesis block 210A and the blockchain system within which blockchain 200 is created verifies the genesis data block based on a proof function.

Note that a variety of approaches may be utilized that remain consistent with the disclosed technology. In some examples relating to distribution of digital content, the user of source environment 110 is a required entity or the only entity permitted to verify or validate content distribution data blocks 142 on the blockchain. In other examples, other entities, such as authorized entities, can verify or validate content distribution data blocks.

In the example of FIG. 2A, access data, such as a public key or other identifier for a transferee, is stored in the content data blocks 142. In the example of FIG. 2A, each content data block 210 contains different digital content for distribution along with the required uses defined by the source for the digital content. To add a content data block with new digital content for distribution, source environment creates content distribution data block 210B, which identifies the digital content, e.g. distributionID2, and the digital content and associated required use and access information, e.g. block_data2, and links block 210B to block 210A. The source environment 110 signs content data block 210B and commits block 210B to blockchain 200 for verification by the blockchain platform.

To add more digital content for distribution, source environment 110 creates content data block 210C to secure digital content for distributionID3 along with block_data3. Similarly, content data block 242D is created by source environment 110 to store the digital content for distributionID4 and content data block 242E is created to store the digital content for distributionID5.

Figure 2B:
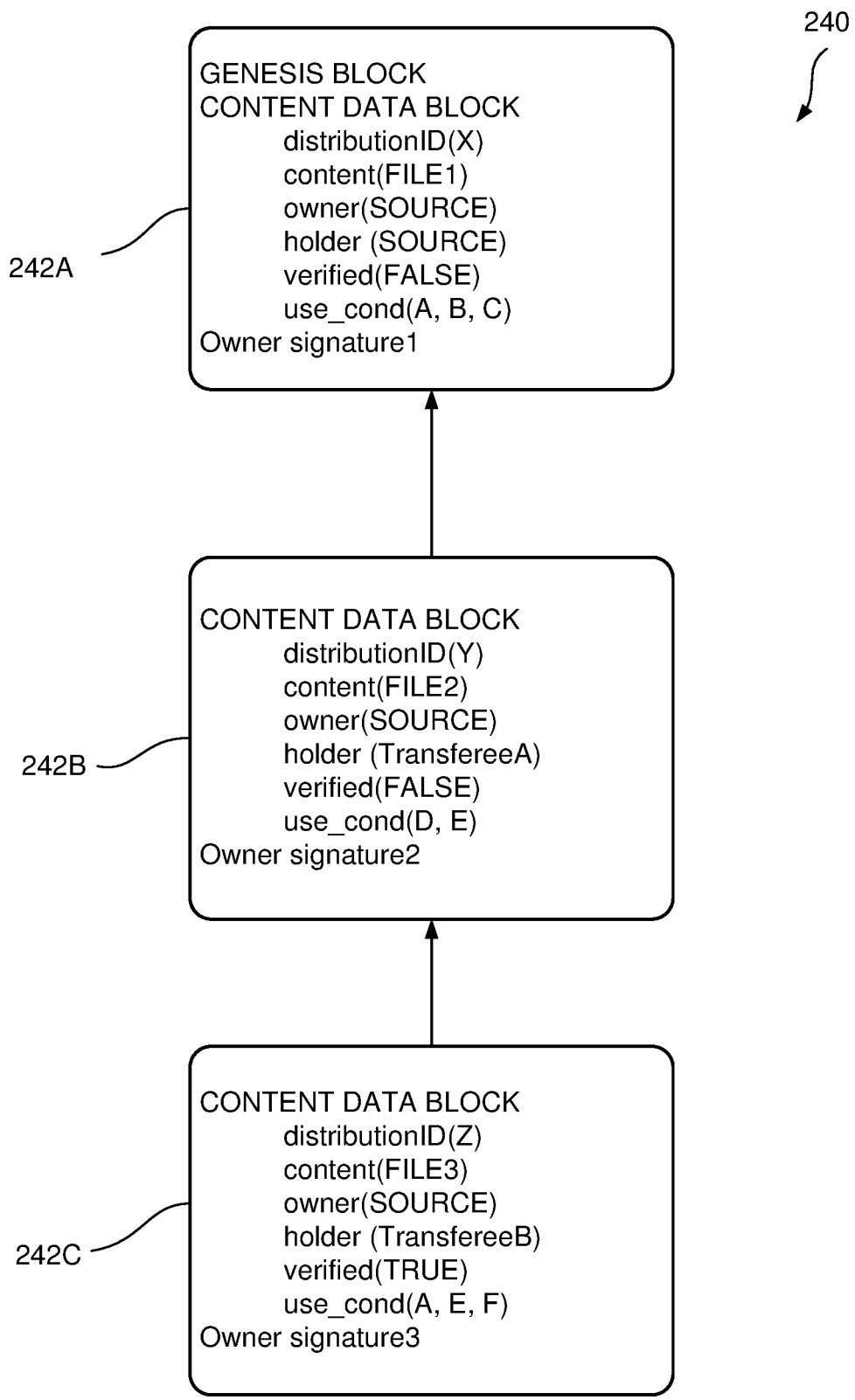
FIG. 2B is a data architecture diagram showing another illustrative example of a content distribution data blockchain where each block on the blockchain stores and controls distribution of digital content.

FIG. 2B is a data architecture diagram showing another illustrative example of a content distribution data blockchain 240, where the content distribution data blocks 242 stores the content, e.g. content(FILE1), and includes identifier data indicating a current owner of the digital content of the block, e.g. a public key for the source entity, and access holder of the block, e.g. a public key for a user entity. Each content distribution data block also stores block state defining required use conditions for the digital content, e.g. use_cond (A, B, C), which can take the form of an array of multiple conditions, and, in this example, a verification flag, e.g. verified(FALSE), that indicates whether the use conditions of the user must be verified by a third party. For example, a geographic use restriction, e.g. US only, may require that the user's IP address be checked using a third party server to determine the user's location, e.g. Canada.

Figure 3A:
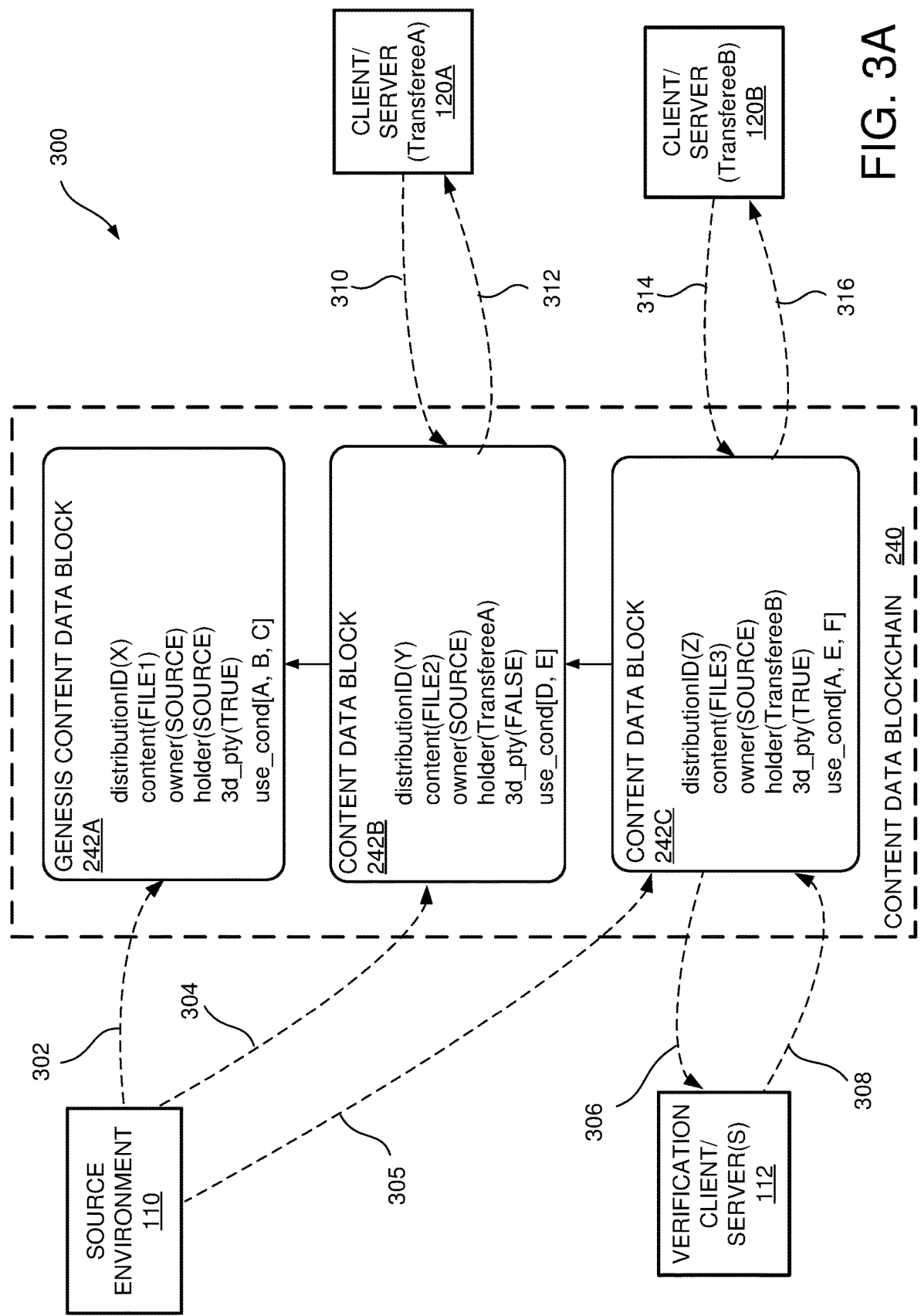
FIG. 3A is a data architecture diagram showing an illustrative example of source environment creating a content distribution data block for distributing digital content and controlling distribution of the digital content to users through use requirements.

A content distribution data blockchain, such as blockchain 140 in FIG. 1 or blockchain 240 in FIG. 2B, enables digital content to be securely stored and distributed with use limitation under the control of a source entity. FIG. 3A is a data architecture diagram showing a simplified illustrative example of the use of a content distribution data blockchain for securely storing and distributing digital content.

Content data block 242A, in this example, illustrates an initial state of content data block when initially created by source environment 110 at 302. Content data block 242A includes an identifier for the digital content, e.g. distributionID(X), the digital content itself, e.g. content(FILE1), and the owner of the digital content set to the source, e.g. owner(SOURCE). These attributes of the content data block are static. In addition, content data block 242A includes an identifier for an access holder for the digital content, which is initially set to the source entity, e.g. holder(SOURCE). A third party verification flag is set to true, e.g. 3d_pty(TRUE). The required use conditions for the digital content FILE1 are defined, e.g. use_cond[A, B, C]. In this example, use_cond is an array of multiple allowed conditions, all of which must be satisfied to access the digital content. For example, A defines a data range during which the content can be accessed, B defines a geographical requirement for access, and C defines a device type requirement for access.

Content data block 242B, in this example, illustrates a content data block with access transferred to a user of client/server device 120A, e.g. TransfereeA. In block 242B, the holder field has been set to an identifier for TransfereeA, e.g. a public key address for TransfereeA. Also, the third party verification flag has been set to FALSE, e.g. 3d_pty (FALSE), which indicates that third party verification of the use of digital content FILE2 by TransfereeA does not need to be verified by a third party. For example, use condition D pertains to an expiration date, which does not require third party verification.

At 310, TransfereeA, using client/server 120A, requests access to digital content FILE2. TransfereeA's current use information, e.g. time, date and device, are compared to the use_cond array to verify that the current use is allowed. If the current use is allowed, then, at 312, digital content FILE2 is distributed to client/server 120A.

Content data block 242C, in this example, illustrates a content data block with access transferred to a user of client/server device 120B, e.g. holder(TransfereeB). However, in this case, the third party verification flag is set to TRUE, e.g. 3d_pty(TRUE), which indicates that third party verification of the use of digital content FILE3 by TransfereeB is required to be verified by a third party. For example, use condition E pertains to a geographical restriction, e.g. the US, and a third party service is utilized to determine the geographical location of TransferreeB from the IP address used by TransfereeB.

At 314, TransfereeB, using client/server 120B, requests access to digital content FILE3. TransfereeB's current use information, e.g. IP address, is submitted to third party verification client/server 112, at 306, which verifies the information or obtains information utilized for verification, e.g. converts the IP address to a geographic location, and returns the result at 308. TransfereeB's current use information is compared to the use_cond array to verify that the current use is allowed. If the current use is allowed, then, at 316, digital content FILE3 is distributed to client/server 120B.

In the example of FIG. 3A, the access to digital content can be controlled by a source entity by identifying a user with access to the digital content and defining required use conditions for the user's access. The disclosed technology enables digital content to be securely stored and distributed on the content distribution data blockchain 240. The blockchain 240 can be made widely accessible to users of the digital content. The blockchain platform supporting the content distribution blockchain ensures the integrity of the digital content and its associated ownership, access, and use conditions.

Scripts for distribution, access and verification of the digital content can be secured by the content distribution data blocks 242 of content distribution data blockchain 240 and executed by the operating system of the decentralized, distributed blockchain platform. FIG. 3B is a data architecture diagram showing an illustrative example of content distribution data block 242 that includes example of the Distribution, Access and Verify scripts. Also shown is a process 320 in a blockchain environment that creates a content distribution data block 242. An example of block state 322 defined for the content distribution data block 242 is also shown.

In this example, the Distribution script is called by the source entity to enable access by a user and define the required use conditions for the digital content. The script checks to verify that the caller is the owner of the block and stores the use conditions sent by the source in the use_conds array.

The example of FIG. 3B also shows the Access script, which is called by a user to access the controlled digital content of the content distribution data block 242. The Access script checks to verify that the user that is the caller is the access holder for the digital content. If the caller is the holder of the block, then the Verify script is called to verify that the current use of the caller meets the use conditions defined in the use_conds array. If the use is verified, then the digital content is distributed to the caller.

Note that the example of FIG. 3B includes a state attribute in the block state 322 for content distribution data block 242. Also note that the Access script defined in the methods 324 updates the state attribute. The approach illustrated in this example shows approach to handling use conditions based on state variables for the digital content. For example, a use condition may be defined that the digital content can only be access N times. Each time the digital content is accessed by the holder, a variable that tracks the number of accesses is incremented. When the access tracking variable reaches N, then further access to the digital content will be denied. Similarly, assuming that access can be transferred to multiple user entities, access may be limited to a maximum number of users, which would also be incremented each time a different user accesses the digital content. Other variations of use conditions involving state variables can be utilized without departing from the disclosed technology.

The example of FIG. 3B also shows the Verify script, which is called when an access request is received to verify that the user's current use meets the use conditions for the controlled digital content defined in the content distribution data block 242. The Verify script checks whether the third party verification indicator is set to true and, if it is, calls third party verification code to obtain a determination from a third party as to whether the user's current use meets the use conditions. In an alternative example, the third party is merely called to obtain use condition information, such as a geographical region determined from the user's IP address, and the information obtained is compared to the use conditions defined for the digital content. If the third party verification indicator is set to false, then the script compares the current use information of the user to the defined use conditions and returns true is all conditions are satisfied or false if a condition is not met.

Figure 4A:
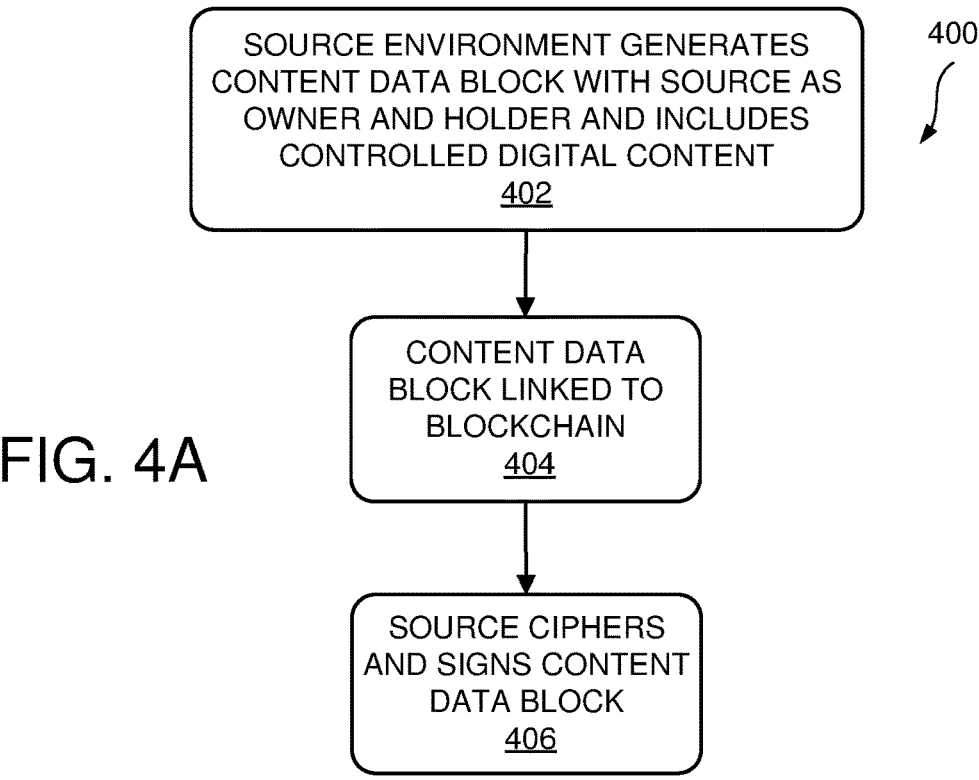
FIG. 4A is a control flow diagram showing an illustrative example of a process for a source entity to create a content distribution data block on a content distribution data blockchain for storing digital content.

FIG. 4A is a control flow diagram showing an illustrative example of a process 400 for creating a content distribution data block for securely storing and distributing digital content on a content distribution data blockchain in accordance with the disclosed technology. This example involves creating a content distribution data block, at 402, that contains the controlled digital content and identifies the source of the digital content as the owner and as the holder. At 404, the content data block created at 402 is linked to the content distribution data blockchain and, at 406, the block is ciphered and signed by the source entity to commit the block to the content distribution data blockchain, such as content distribution data blockchain 140 in FIG. 1 or content distribution data blockchain 240 of FIG. 2B.

Figure 4B:
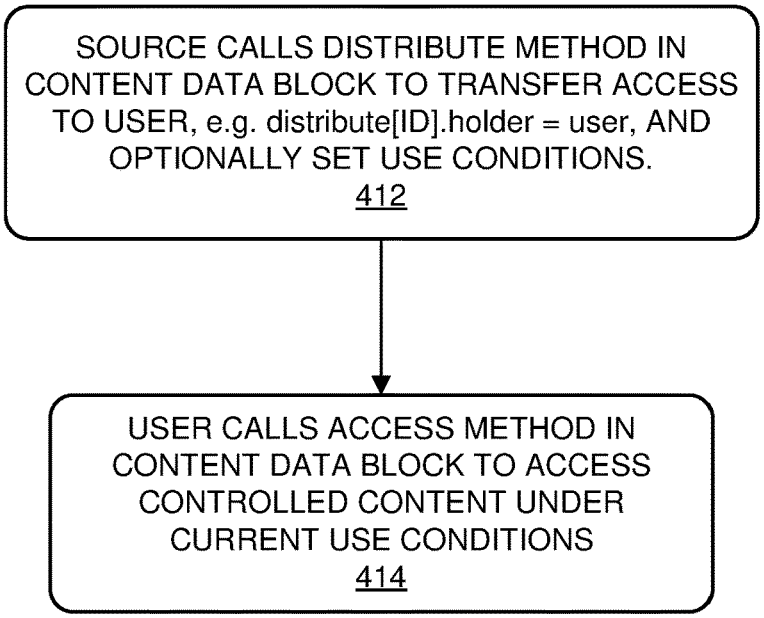
FIG. 4B is a control flow diagram showing an illustrative example of a process for transferring access to a user entity using a content distribution data block on a content distribution data blockchain.

FIG. 4B is a control flow diagram showing an illustrative example of a process 410 for a source entity to give a user or transferee access to the digital content. At 412, the source entity calls a distribute method in the content distribution data block, which sets the access holder identifier in the block to an identifier for the user, such as a public key address for the user. In some examples, the source entity can also define the use conditions in the call to the distribute method. At 414, a user calls an access method in the content distribution data block to access the controlled digital content under the user's current use conditions.

Figure 4C:
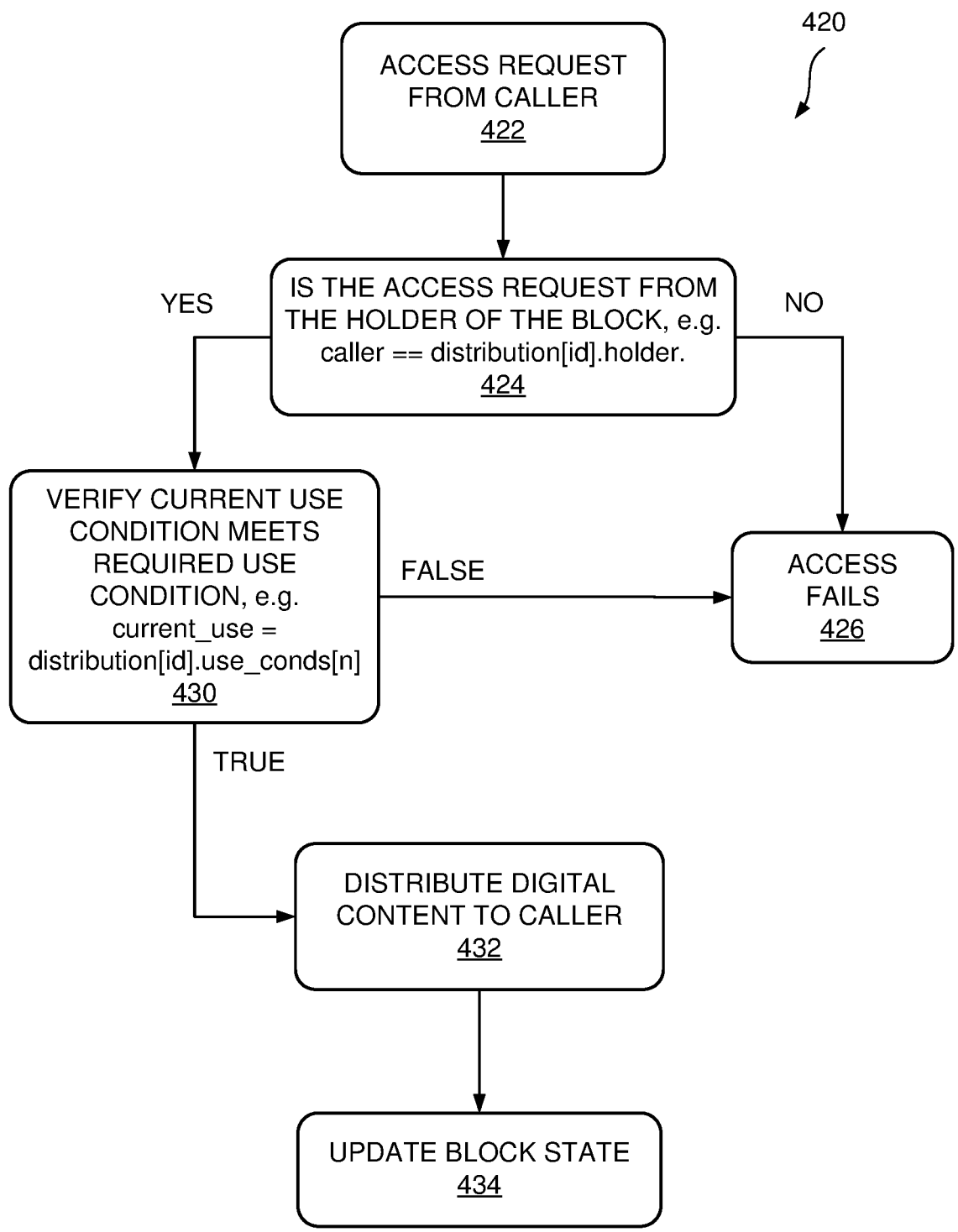
FIG. 4C is a control flow diagram illustrating an example of a process for accessing digital content on a content distribution data block.

FIG. 4C is a control flow diagram illustrating an example of an access process 420 for a user to obtain access to the digital content of a content distribution data block. At 422, an access request is received from a caller. At 424, the caller is checked against the access holder defined in the content distribution data block, e.g. caller==distribution[id].holder. If the caller is not an access holder for the content distribution data block, then access is denied, at 426.

If the caller is a defined access holder, then control branches at 424 to 430, where the current use of the caller is checked against the required use conditions defined in the content distribution data block. If the required use conditions are not met, then access is denied, at 426. If the require use conditions are met, then control branches to 432 to distribute the digital content to the caller. For example, a private key may be utilized to decrypt the digital content before streaming the content to the caller. In some examples, certain state variables, such as a variable tracking the number of times the digital content has been accessed, can be updated at 434.

Figure 4D:
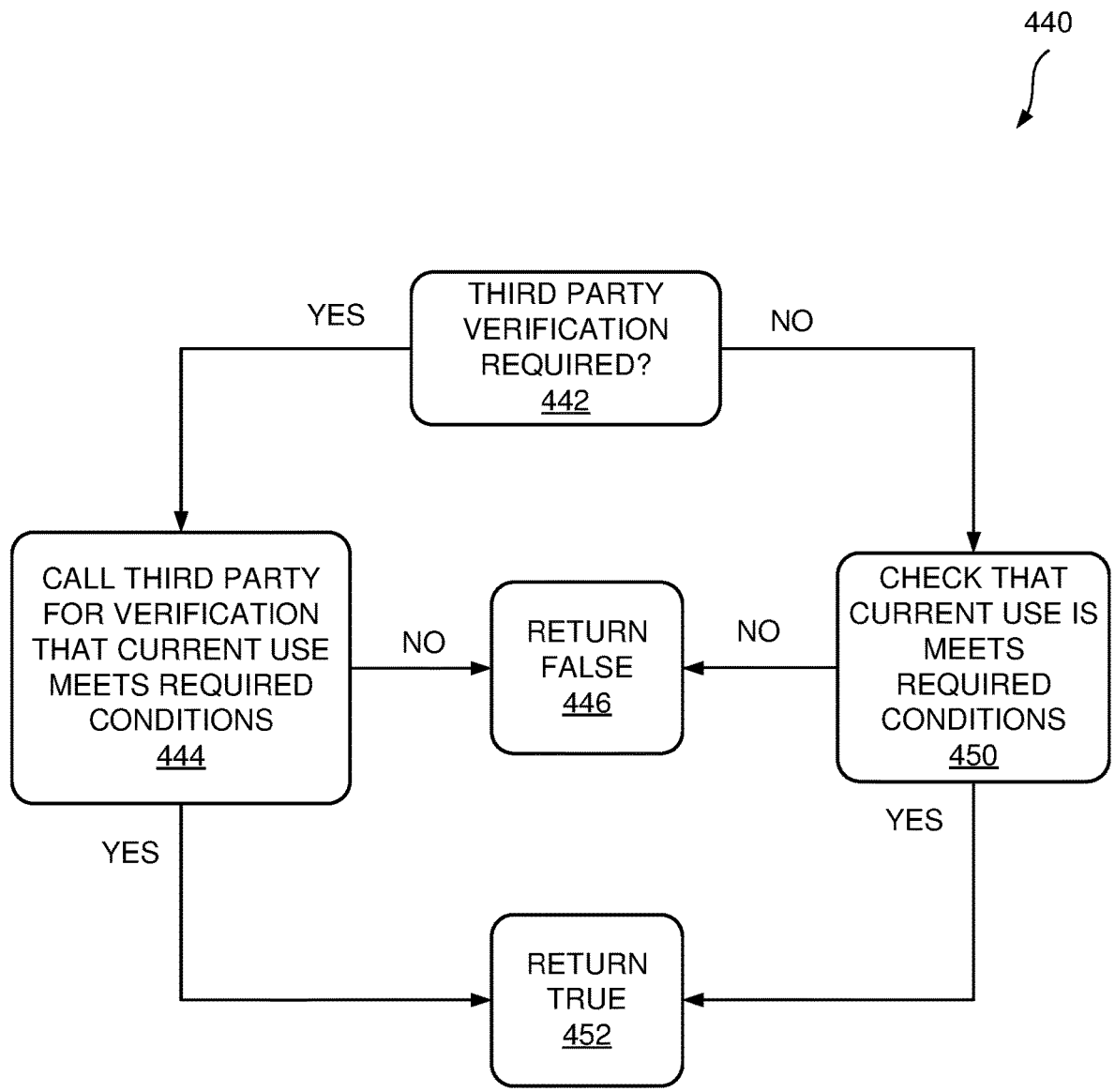
FIG. 4D is a control flow diagram illustrating an example of a process for verifying that access by a user meets required conditions for accessing digital content on a content distribution data blockchain.

FIG. 4D is a control flow diagram illustrating one example of a verification process 440 for checking whether the current use conditions of a calling user meet the required conditions defined for digital content stored in a content distribution data block. At 442, a determination is made as to whether third party verification is required. If third party verification is required, control branches to 444 to call a third party for verification that the caller's current use meets the required conditions defined for the digital content. If the required conditions are not met, control branches to 446 to return a FALSE indicating caller failed to meet the required use conditions. If the required conditions are met, control branches to 452 to return TRUE indicating that the caller meets the required use conditions.

If, at 442, it is determined that third party verification is not required, control branches to 450 to check that the current use of the caller meets the required conditions. If the conditions are not met, control branches to 446 to return FALSE. If the conditions are met, control branches to 452 to return TRUE.

Figure 4E:
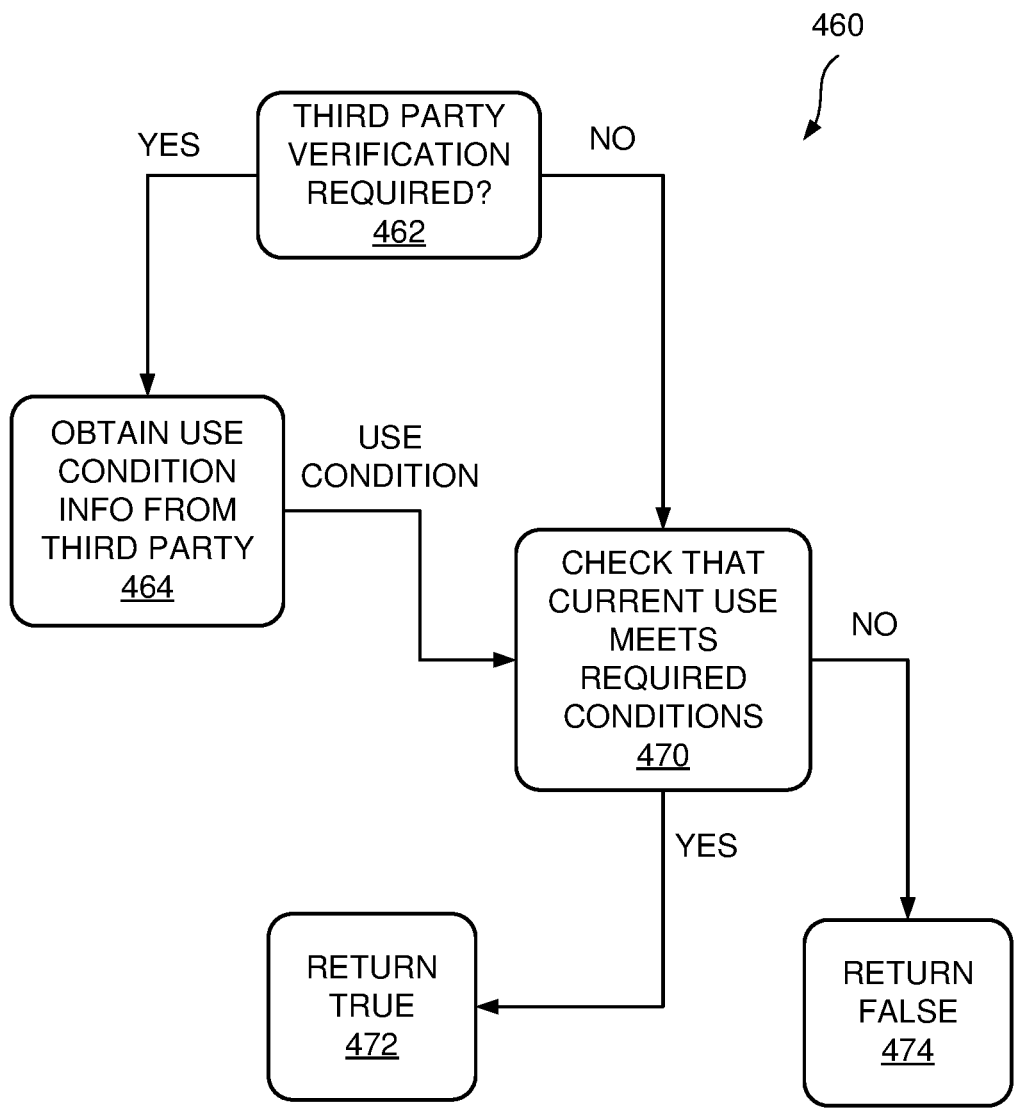
FIG. 4E is a control flow diagram illustrating another example of a process for verifying that access by a user meets required conditions for accessing digital content on a content distribution data blockchain.

FIG. 4E is a control flow diagram illustrating one example of an alternative verification process 460 for checking whether the current use conditions of a calling user meet the required conditions defined for digital content stored in a content distribution data block. At 462, a determination is made as to whether third party verification is required. If third party verification is required, control branches to 464 to call a third party to obtain use condition information from a third party. For example, the caller's IP address may be sent to a third party server to obtain a corresponding geographical location.

The use condition information obtained from the third party is provided to 470 for use in verifying whether the caller's current use meets the required conditions defined for the digital content. If the required conditions are not met, control branches to 472 to return a FALSE indicating caller failed to meet the required use conditions. If the required conditions are met, control branches to 474 to return TRUE indicating that the caller meets the required use conditions.

It should be appreciated that the processes shown for examples and a variety of other approaches may be utilized without departing from the disclosed technology.

Depending upon the scripting capabilities of the blockchain platform, the data blocks of the content distribution data blockchain may include more extensive code execution. For example, a content distribution system that provides for shared access to the digital content by multiple users may require more extensive code execution capability in the blockchain than a content distribution system that limits access to a single user. Similarly, a content distribution system based on a content distribution data blockchain that decrypts the digital content or utilizes information from third parties for verification may require more extensive code execution capability in the blockchain.

It should be appreciated that the utilization of blockchain technology, such as scripting technology within smart contracts, in this context provides a high degree of flexibility and variation in the configuration of implementations without departing from the teachings of the present disclosure.

Note that the disclosed technology may be applied to controlling distribution of a variety of types of digital content. The technology may be applied to secure storage and distribution of digital content.

Figure 5:
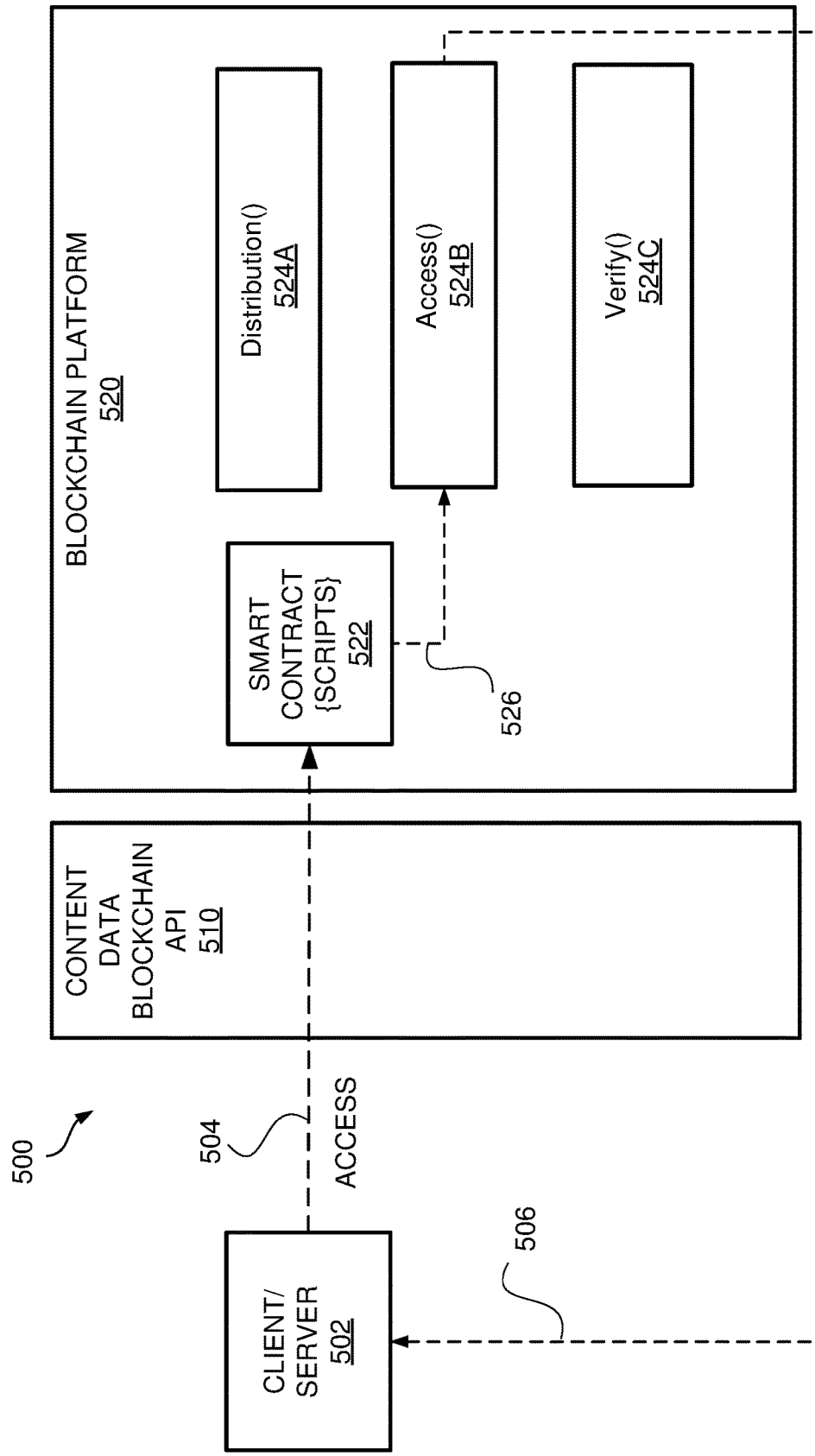
FIG. 5 is a data architecture diagram showing an illustrative example of a user using an application programming interface to access digital content on a content distribution data blockchain.

FIG. 5 is a data architecture diagram showing an illustrative example of an interface for accessing a content distribution data blockchain, such as blockchain 140 in FIG. 1, blockchain 200 in FIG. 2A, blockchain 240 in FIG. 2B, or blockchain 240 in FIG. 3A. In this example, an evaluation Application Program Interface (API) 510 provides an interface to the blockchain platform 520 that supports the content distribution data blockchain. The blockchain platform 520 supports a smart contract 522, such as content distribution data block 242 in FIG. 3B, which includes scripts 524 with code that, when executed by the blockchain platform 520, performs operations with respect to the content distribution data blockchain.

In the example of FIG. 5, three scripts are defined in smart contract 522. The Distribution script 524A permits an owner of digital content to provide access rights to a user to access digital content stored on a content distribution data blockchain. The Access script 524B provides for a user to request access to digital content stored on the blockchain. The Verify script is used to verify that the calling user's current use meets the required used conditions for digital content as defined on the blockchain.

In the example of FIG. 5, a user of client/server 502, sends an access requires 504 through the content data blockchain API 510 to smart contract 522 to invoke, at 526, the Access script 524B. The Access script performs the checks described above and, if the checks are successful, distributes, at 506, the digital content to client/server 502.

Blockchain Ledger Data Structure

Figure 6A:
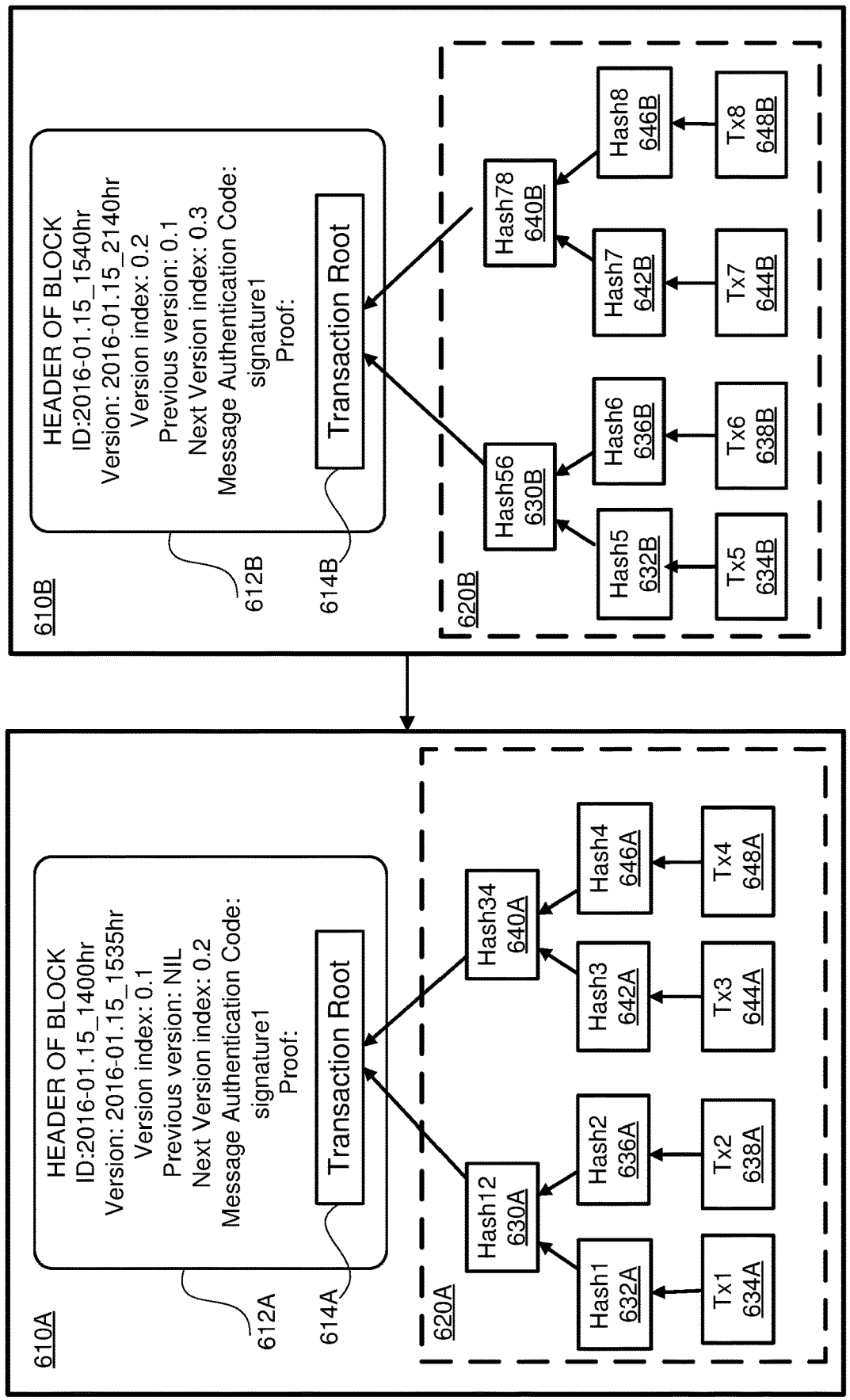
FIG. 6A is a data architecture diagram illustrating a simplified example of a blockchain ledger based on the content distribution data blocks of the content distribution data blockchain of FIG. 1.

FIG. 6A is a data architecture diagram illustrating a simplified example of a blockchain ledger 600 based on the blocks 142A-E of the content distribution data blockchain 140 of FIG. 1. The blockchain ledger 600 example of FIG. 6A is simplified to show block headers, metadata and signatures of blocks 210A-E in order to demonstrate a secure digital content ledger using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
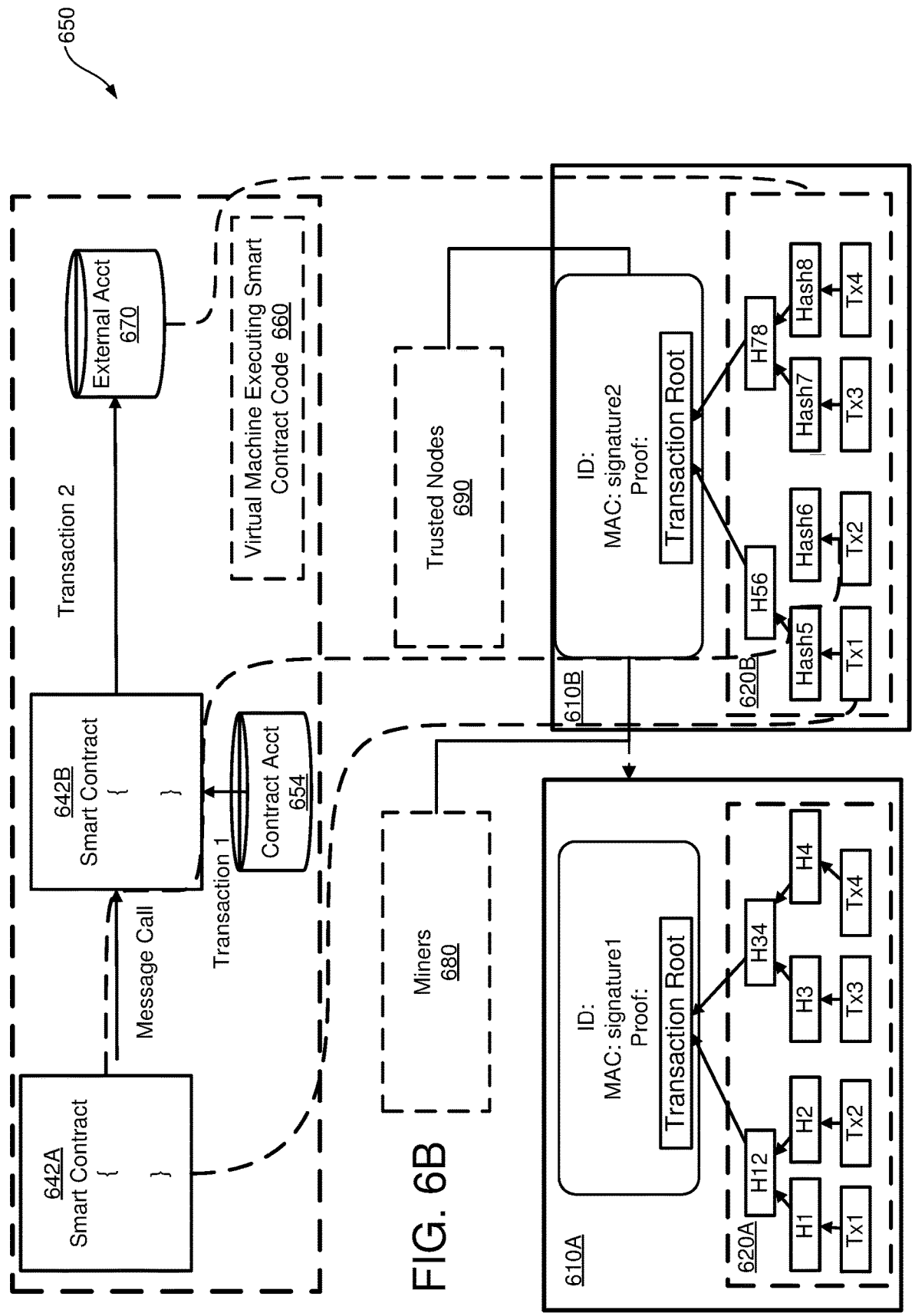
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 642 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 642 are executed in a virtual machine environment, although this is optional.

In FIG. 6B, the aspects of smart contracts 642 are stored in transaction data nodes in data tree 620 in the blocks 610 of the blockchain ledger of FIG. 6A. In the example of FIG. 6B, Smart Contract 642A is stored in data block Tx1 node 634A of data tree 620A in block 610A, Smart Contract 642B is stored in Tx2 node 638A, Contract Account 654 associated with Smart Contract 642B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process for blocks on the ledger is determined by a centralized control of a cluster of trusted nodes. In this case, the centralized control may be a trusted node, such as source environment 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a content distribution data block 142 for content distribution data blockchain 140, the block is an unconfirmed and unidentified entity. To be part of the acknowledged "currency", it may be added to the blockchain, and therefore relates to the concept of a trusted cluster.

In a trusted cluster, when a content distribution data block 142 is added, every node competes to acknowledge the next "transaction" (e.g. a new content distribution data block). In one example, the nodes compete to mine and get the lowest hash value: min{previous_hash, contents_hash, random_nonce_to_be_guessed}->result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to the data file, may also be ciphered for restricted access so that the meta-data does not disclose information pertaining to the data file.

Figure 4F:
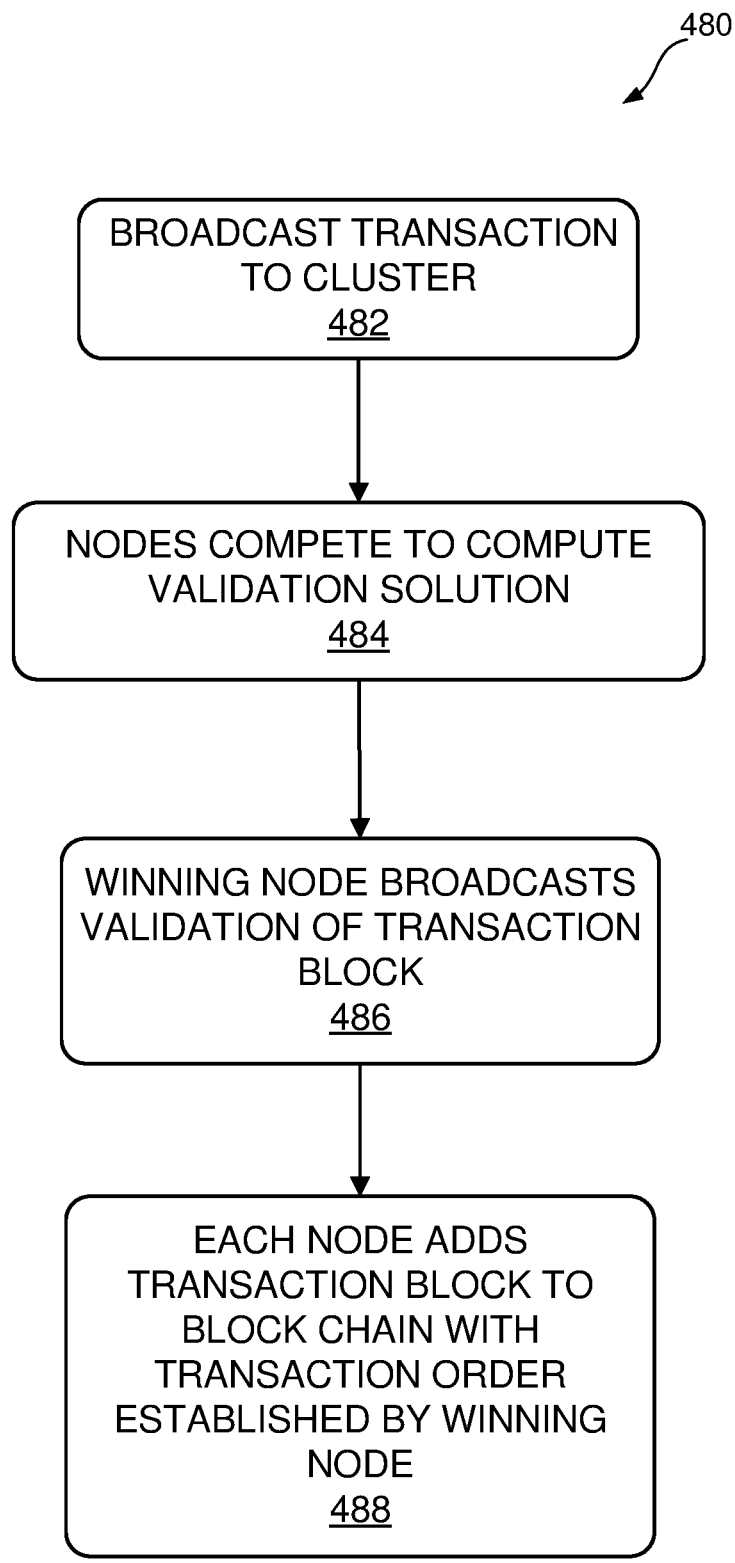
FIG. 4F is a control flow diagram illustrating an example of a validation process for blocks added to the content distribution data blockchain distributed to untrusted nodes.

The mining process, such as may be used in concert with the validation process 480 of FIG. 4F, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast, at 482, to the network using software Mining nodes compete, at 484, to compute a validation solution to validate transactions, and then broadcast, at 486, the completed block validation to other nodes. Each node adds the block, at 488, to its copy of the blockchain with transaction order established by the winning node.

Note that in a restricted network, stake-holders who are authorized to check or mine for the data file may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the content distribution data blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to a distributed content distribution data blockchain may be restricted by cryptographic means to be only open to authorized servers. Since the content distribution data blockchain ledger is distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a content distribution data blockchain ledger. The specific examples of different aspects of a content distribution data blockchain ledger described herein are illustrative and are not intended to limit the scope of the techniques shown.

Smart Contracts

Smart contracts are defined by code. As described previously, the terms and conditions of the smart contract may be encoded (e.g., by hash) into a blockchain ledger. Specifically, smart contracts may be compiled into a bytecode (if executed in a virtual machine), and then the bytecode may be stored in a blockchain ledger as described previously. Similarly, transaction data executed and generated by smart contracts may be stored in the blockchain ledger in the ways previously described.

Computer Architectures for Use of Smart Contracts and Blockchain Ledgers

Figure 8:
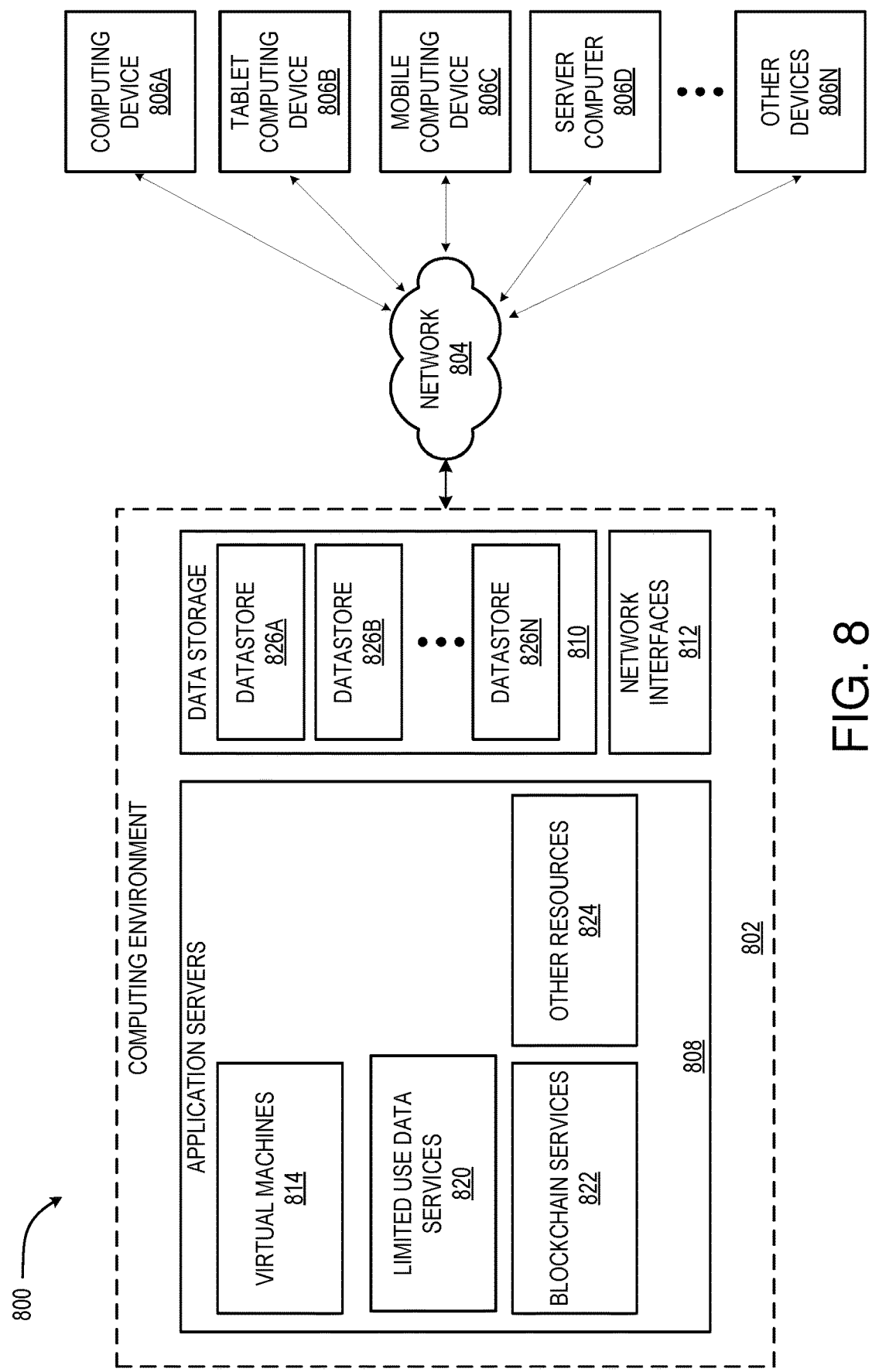
FIG. 8 is a diagram illustrating a distributed computing environment capable of implementing aspects of the techniques and technologies presented herein.

Note that at least parts of processes 400, 410, 420, 440, 460 and 480 of FIGS. 4A, 4B, 4C, 4D, 4E, and 4F, the scripts of content distribution data block 242 of FIG. 3B, smart contract 522 of FIG. 5, smart contracts 642 of FIG. 6B, and other processes and operations pertaining to a content distribution data blockchain ledger described herein may be implemented in one or more servers, such as computer environment 800 in FIG. 8, or the cloud, and data defining the results of user control input signals translated or interpreted as discussed herein may be communicated to a user device for display. Alternatively, the content distribution data blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 410, 420, 440, 460 and 480 of FIGS. 4A, 4B, 4C, 4D, 4E, and 4F, the scripts of content distribution data block 242 of FIG. 3B, smart contract 522 of FIG. 5, smart contracts 642 of FIG. 6B) are described herein as being implemented, at least in part, by an application, component, and/or circuit. Although the following illustration refers to the components of FIGS. 1, 3B, 4A, 4B, 4C, 4D, 4E, 4F, 5 and 6B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 410, 420, 440, 460 and 480 of FIGS. 4A, 4B, 4C, 4D, 4E, and 4F, the scripts of content distribution data block 242 of FIG. 3B, smart contract 522 of FIG. 5, smart contracts 642 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
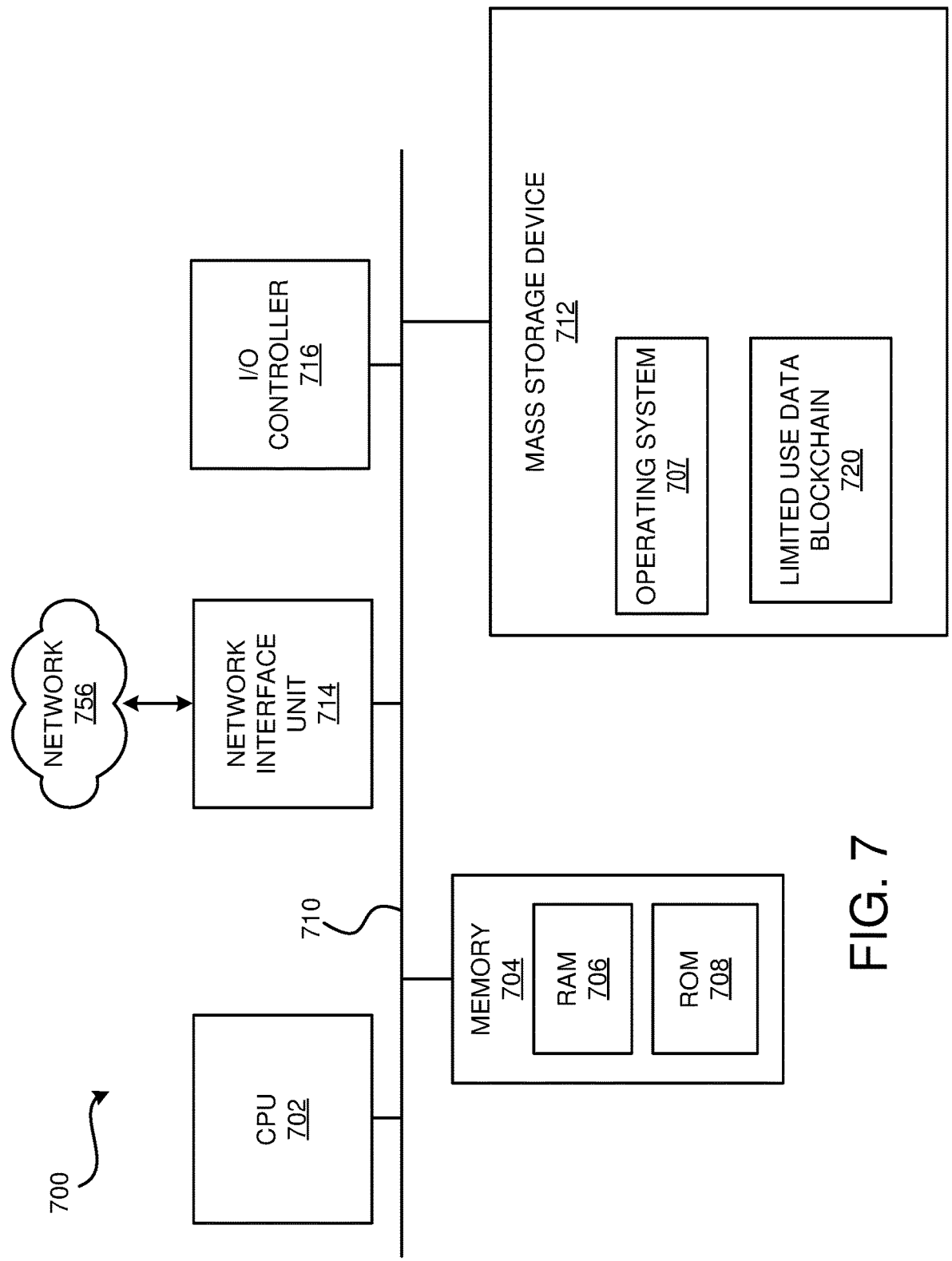
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the devices 110 and 120A-C (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of content distribution data blockchain data 720), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for a content distribution data blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 556, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for a data management blockchain ledger. It should be understood that this configuration is illustrative only and should not be construed as being limiting in any way.

According to various implementations, the application servers 808 also include one or more data file management services 820 and one or more blockchain services 822. The data file management services 820 can include services for managing a data file on a content distribution data blockchain, such as content distribution data blockchain 140 in FIG. 1. The blockchain services 822 can include services for participating in management of one or more blockchains, such as by creating genesis blocks, content distribution data blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a content distribution data blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting a content distribution data blockchain ledger, among other aspects.

Figure 9:
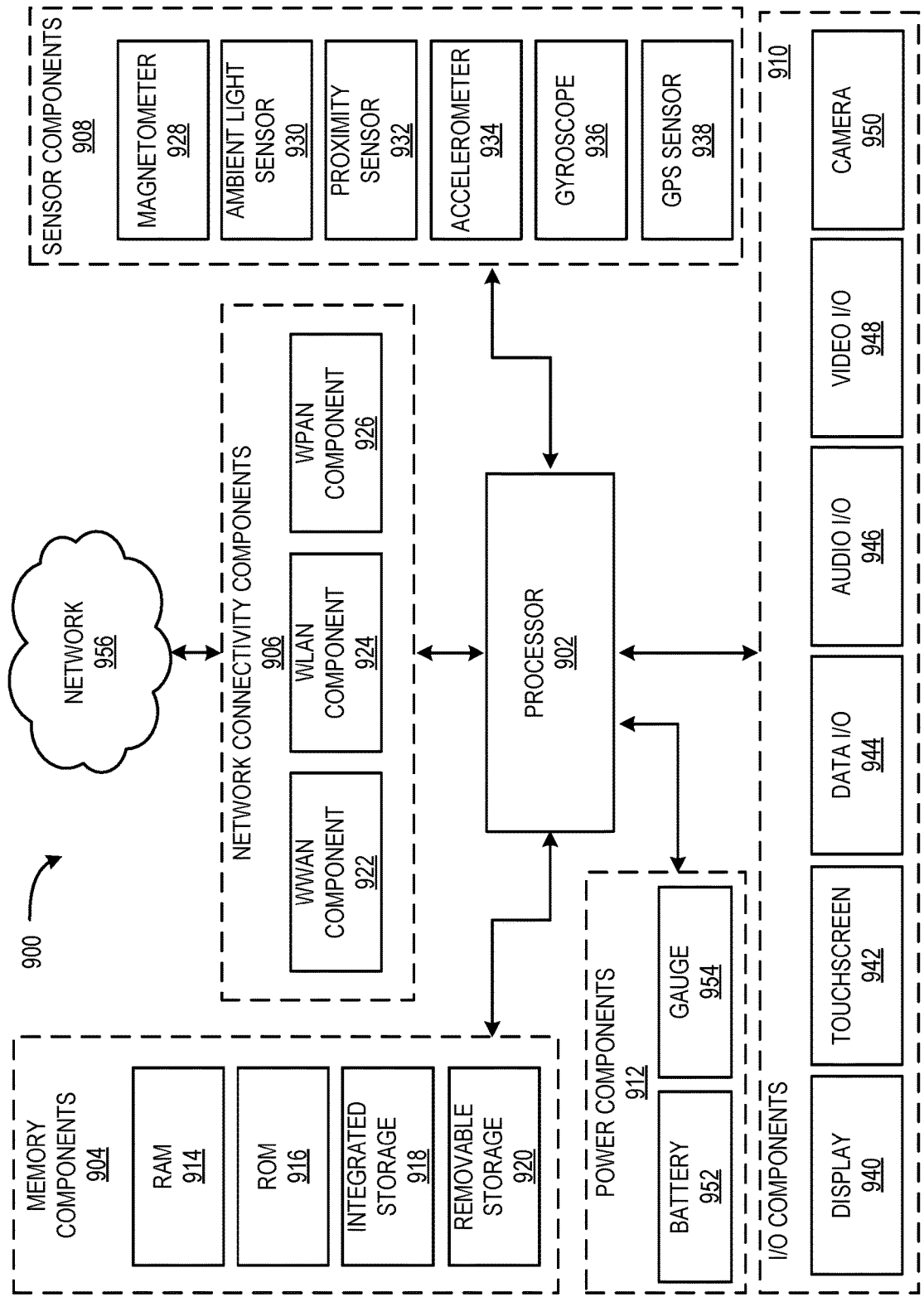
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for a content distribution data blockchain ledger. The computing device architecture 900 is applicable to computing devices that can manage a content distribution data blockchain ledger. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the source environment 110, verification client/server(s) 112, and client/servers 120A-C shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, MAC OS or IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

Examples of Various Implementations

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

In closing, although the various configurations have been described in language specific to structural features and/or methodological acts, it is to be understood that the subject matter defined in the appended representations is not necessarily limited to the specific features or acts described.

Rather, the specific features and acts are disclosed as example forms of implementing the claimed subject matter.

The present disclosure is made in light of the following clauses:

Clause 1. A computer-implemented content distribution method, the method comprising: generating a content distribution data block on a content distribution data blockchain, the content distribution data block storing a digital content, data identifying the digital content, an owner identifier for identifying an owner of the digital content, an access holder identifier for identifying at least one user entity having access to the digital content, and a use conditions attribute for identifying use requirements for the digital content; defining a use requirement in the use conditions attribute; setting, by an owner entity identified in the owner identifier of the content distribution data block, the access holder identifier to an identifier for a user entity; receiving an access request from the user entity; responsive to the access request from the user entity, verifying whether a current use condition of the user entity satisfies the use requirement in the use conditions attribute; and if it is verified that the current use condition of the user entity satisfies the use requirement in the use conditions attribute, distributing the digital content to the first user entity.

Clause 2. The computer-implemented method of Clause 1, where: the first content distribution data block includes a third party verification indicator for indicating that third party verification is required; the use requirement defined in the use conditions attribute corresponds to information to be obtained from a third party verification entity; and the step of verifying whether a current use condition of the user entity satisfies the use requirement in the use conditions attribute comprises, if the third party verification indicator indicates that third party verification is required, verifying whether the current use condition of the user entity satisfies the use requirement in the use conditions attribute utilizing the third party verification entity.

Clause 3. The computer-implemented method of Clause 2, where the step of verifying whether the current use condition of the user entity satisfies the use requirement in the use conditions attribute utilizing the third party verification entity comprises: obtaining from the third party verification entity information corresponding to the current use condition of the user entity; and verifying whether the information corresponding to the current use condition of the user entity the satisfies the use requirement in the use conditions attribute.

Clause 4. The computer-implemented method of Clause 2, where the step of verifying whether the current use condition of the user entity satisfies the use requirement in the use conditions attribute utilizing the third party verification entity comprises: verifying by the third party verification entity whether the current use condition of the user entity satisfies the use requirement in the use conditions attribute.

Clause 5. The computer-implemented method of Clause 1, where: multiple use requirements are defined in the use conditions attribute; the current use condition of the user entity comprises multiple current use conditions; and the step of verifying whether a current use condition of first user entity satisfies the use requirement in the use conditions attribute comprises: verifying that the multiple current use conditions of the user entity satisfy the multiple use requirements defined in the use conditions attribute.

Clause 6. The computer-implemented method of Clause 1, where the use requirement defined in the use conditions attribute and the current use condition of the user entity pertain to time, time duration, date, geographic location, virtual location, device type, a number of accesses to the digital content, and a number of users who have accessed the digital content.

Clause 7. The computer-implemented method of Clause 1, where the digital content comprises one or more of audio content, image content, video content, text content, an audio streaming service, an image streaming service, a text streaming service, and a video streaming service.

Clause 8. A system for content distribution on a blockchain, the system comprising: one or more processors; and one or more memory devices in communication with the one or more processors, the memory devices having computer-readable instructions stored thereupon that, when executed by the processors, cause the processors to perform a method comprising: generating a content distribution data block on a content distribution data blockchain, the content distribution data block storing a digital content, data identifying the digital content, an owner identifier for identifying an owner of the digital content, an access holder identifier for identifying at least one user entity having access to the digital content, and a use conditions attribute for identifying use requirements for the digital content; defining a use requirement in the use conditions attribute; setting, by an owner entity identified in the owner identifier of the content distribution data block, the access holder identifier to an identifier for a user entity; receiving an access request from the user entity; responsive to the access request from the user entity, verifying whether a current use condition of the user entity satisfies the use requirement in the use conditions attribute; and if it is verified that the current use condition of the user entity satisfies the use requirement in the use conditions attribute, distributing the digital content to the first user entity.

Clause 9. The system of Clause 8, where: the first content distribution data block includes a third party verification indicator for indicating that third party verification is required; the use requirement defined in the use conditions attribute corresponds to information to be obtained from a third party verification entity; and the step of verifying whether a current use condition of the user entity satisfies the use requirement in the use conditions attribute comprises, if the third party verification indicator indicates that third party verification is required, verifying whether the current use condition of the user entity satisfies the use requirement in the use conditions attribute utilizing the third party verification entity.

Clause 10. The system of Clause 9, where the step of verifying whether the current use condition of the user entity satisfies the use requirement in the use conditions attribute utilizing the third party verification entity comprises: obtaining from the third party verification entity information corresponding to the current use condition of the user entity; and verifying whether the information corresponding to the current use condition of the user entity the satisfies the use requirement in the use conditions attribute.

Clause 11. The system of Clause 9, where the step of verifying whether the current use condition of the user entity satisfies the use requirement in the use conditions attribute utilizing the third party verification entity comprises: verifying by the third party verification entity whether the current use condition of the user entity satisfies the use requirement in the use conditions attribute.

Clause 12. The system of Clause 8, where: multiple use requirements are defined in the use conditions attribute; the current use condition of the user entity comprises multiple current use conditions; and the step of verifying whether a current use condition of first user entity satisfies the use requirement in the use conditions attribute comprises: verifying that the multiple current use conditions of the user entity satisfy the multiple use requirements defined in the use conditions attribute.

Clause 13. The system of Clause 8, where the use requirement defined in the use conditions attribute and the current use condition of the user entity pertain to time, time duration, date, geographic location, virtual location, device type, a number of accesses to the digital content, and a number of users who have accessed the digital content.

Clause 14. The system of Clause 8, where the digital content comprises one or more of audio content, image content, video content, text content, an audio streaming service, an image streaming service, a text streaming service, and a video streaming service.

Clause 15. One or more computer storage media having computer executable instructions stored thereon which, when executed by one or more processors, cause the processors to execute a content distribution method comprising: generating a content distribution data block on a content distribution data blockchain, the content distribution data block storing a digital content, data identifying the digital content, an owner identifier for identifying an owner of the digital content, an access holder identifier for identifying at least one user entity having access to the digital content, and a use conditions attribute for identifying use requirements for the digital content; defining a use requirement in the use conditions attribute; setting, by an owner entity identified in the owner identifier of the content distribution data block, the access holder identifier to an identifier for a user entity; receiving an access request from the user entity; responsive to the access request from the user entity, verifying whether a current use condition of the user entity satisfies the use requirement in the use conditions attribute; and if it is verified that the current use condition of the user entity satisfies the use requirement in the use conditions attribute, distributing the digital content to the first user entity.

Clause 16. The computer storage media of Clause 15, where: the first content distribution data block includes a third party verification indicator for indicating that third party verification is required; the use requirement defined in the use conditions attribute corresponds to information to be obtained from a third party verification entity; and the step of verifying whether a current use condition of the user entity satisfies the use requirement in the use conditions attribute comprises, if the third party verification indicator indicates that third party verification is required, verifying whether the current use condition of the user entity satisfies the use requirement in the use conditions attribute utilizing the third party verification entity.

Clause 17. The computer storage media of Clause 16, where the step of verifying whether the current use condition of the user entity satisfies the use requirement in the use conditions attribute utilizing the third party verification entity comprises: obtaining from the third party verification entity information corresponding to the current use condition of the user entity; and verifying whether the information corresponding to the current use condition of the user entity the satisfies the use requirement in the use conditions attribute.

Clause 18. The computer storage media of Clause 16, where the step of verifying whether the current use condition of the user entity satisfies the use requirement in the use conditions attribute utilizing the third party verification entity comprises: verifying by the third party verification entity whether the current use condition of the user entity satisfies the use requirement in the use conditions attribute.

Clause 19. The computer storage media of Clause 15, where: multiple use requirements are defined in the use conditions attribute; the current use condition of the user entity comprises multiple current use conditions; and the step of verifying whether a current use condition of first user entity satisfies the use requirement in the use conditions attribute comprises: verifying that the multiple current use conditions of the user entity satisfy the multiple use requirements defined in the use conditions attribute.

Clause 20. The computer storage media method of Clause 15, where: the use requirement defined in the use conditions attribute and the current use condition of the user entity pertain to time, time duration, date, geographic location, virtual location, device type, a number of accesses to the digital content, and a number of users who have accessed the digital content; and the digital content comprises one or more of audio content, image content, video content, text content, an audio streaming service, an image streaming service, a text streaming service, and a video streaming service.

What is claimed is:

1. A computer-implemented method comprising:
   receiving, from a first entity, an access request for digital content associated with one or more blocks of a blockchain, the one or more blocks of the blockchain including an owner identifier identifying a second entity as an owner of the digital content and an access holder identifier identifying the first entity as an access holder having access to the digital content;
   verifying that the first entity is the access holder defined by the one or more blocks of the blockchain;
   verifying that a current use condition satisfies a use requirement conditions attribute defined by the one or more blocks of the blockchain; and
   responsive to verifying the first entity is the access holder and the current use condition satisfies the use requirement conditions attribute, providing the first entity access to the digital content.

2. The computer-implemented method of claim 1, wherein:
   the one or more blocks of the blockchain include a third party verification indicator for indicating that third party verification is required;
   the use requirement conditions attribute corresponds to information to be obtained from a third party verification entity; and
   the current use condition is verified to satisfy the use requirement conditions attribute utilizing the third party verification entity.

3. The computer-implemented method of claim 2, wherein the current use condition is verified to satisfy the use requirement conditions attribute utilizing the third party verification entity by:
   obtaining, from the third party verification entity information corresponding to the current use condition; and
   verifying that the information corresponding to the current use condition satisfies the use requirement conditions attribute.

4. The computer-implemented method of claim 2, wherein the current use condition is determined to satisfy the use requirement conditions attribute utilizing the third party verification entity by:
   verifying, by the third party verification entity, that the current use condition of the entity satisfies the use requirement conditions attribute.

5. The computer-implemented method of claim 1, wherein:
- multiple use requirements are defined in the use requirement conditions attribute;
- the current use condition comprises a set of current conditions; and
- the current use condition is verified to satisfy the use requirement conditions attribute by: verifying that the set of current use conditions satisfy the multiple use requirements defined in the use requirement conditions attribute.

6. The computer-implemented method of claim 1, wherein the use requirement conditions attribute and the current use condition pertain to one or more selected from the following: time, time duration, date, geographic location, virtual location, device type, a number of accesses to the digital content, and a number of users who have accessed the digital content.

7. The computer-implemented method of claim 1, wherein the digital content comprises one or more selected from the following: audio content, image content, video content, text content, an audio streaming service, an image streaming service, a text streaming service, and a video streaming service.

8. A system comprising:
- one or more processors; and
- one or more memory devices in communication with the one or more processors, the one or more memory devices having computer-readable instructions stored thereupon that, when executed by the one or more processors, cause the one or more processors to perform operations comprising:
  - receiving, from a first entity, an access request for digital content associated with one or more blocks of a blockchain, the one or more blocks of the blockchain including an owner identifier identifying a second entity as an owner of the digital content and an access holder identifier identifying the first entity as an access holder having access to the digital content;
  - verifying that the first entity is the access holder defined by the one or more blocks of the blockchain;
  - verifying that a current use condition satisfies a use requirement conditions attribute defined by the one or more blocks of the blockchain; and
  - responsive to verifying the first entity is the access holder and the current use condition satisfies the use requirement conditions attribute, providing the first entity access to the digital content.

9. The system of claim 8, wherein:
- the one or more blocks of the blockchain include a third party verification indicator for indicating that third party verification is required;
- the use requirement conditions attribute corresponds to information to be obtained from a third party verification entity; and
- the current use condition is verified to satisfy the use requirement conditions attribute utilizing the third party verification entity.

10. The system of claim 9, wherein the current use condition is verified to satisfy the use requirement conditions attribute utilizing the third party verification entity by:
- obtaining, from the third party verification entity information corresponding to the current use condition; and
- verifying that the information corresponding to the current use condition satisfies the use requirement conditions attribute.

11. The system of claim 9, wherein the current use condition is determined to satisfy the use requirement conditions attribute utilizing the third party verification entity by:
- verifying, by the third party verification entity, that the current use condition of the entity satisfies the use requirement conditions attribute.

12. The system of claim 8, wherein:
- multiple use requirements are defined in the use requirement conditions attribute;
- the current use condition comprises a set of current conditions; and
- the current use condition is verified to satisfy the use requirement conditions attribute by: verifying that the set of current use conditions satisfy the multiple use requirements defined in the use requirement conditions attribute.

13. The system of claim 8, wherein the use requirement conditions attribute and the current use condition pertain to one or more selected from the following: time, time duration, date, geographic location, virtual location, device type, a number of accesses to the digital content, and a number of users who have accessed the digital content.

14. The system of claim 8, wherein the digital content comprises one or more selected from the following: audio content, image content, video content, text content, an audio streaming service, an image streaming service, a text streaming service, and a video streaming service.

15. One or more computer storage media having computer executable instructions stored thereon which, when executed by one or more processors, cause the one or more processors to execute operations comprising:
- receiving, from a first entity, an access request for digital content associated with one or more blocks of a blockchain, the one or more blocks of the blockchain including an owner identifier identifying a second entity as an owner of the digital content and an access holder identifier identifying the first entity as an access holder having access to the digital content;
- verifying that the first entity is the access holder defined by the one or more blocks of the blockchain;
- verifying that a current use condition satisfies a use requirement conditions attribute defined by the one or more blocks of the blockchain; and
- responsive to verifying the first entity is the access holder and the current use condition satisfies the use requirement conditions attribute, providing the first entity access to the digital content.

16. The one or more computer storage media of claim 15, wherein:
- the one or more blocks of the blockchain include a third party verification indicator for indicating that third party verification is required;
- the use requirement conditions attribute corresponds to information to be obtained from a third party verification entity; and
- the current use condition is verified to satisfy the use requirement conditions attribute utilizing the third party verification entity.

17. The one or more computer storage media of claim 16, wherein the current use condition is verified to satisfy the use requirement conditions attribute utilizing the third party verification entity by:
- obtaining, from the third party verification entity information corresponding to the current use condition; and verifying that the information corresponding to the current use condition satisfies the use requirement conditions attribute.

18. The one or more computer storage media of claim 16, wherein the current use condition is determined to satisfy the use requirement conditions attribute utilizing the third party verification entity by:
   verifying, by the third party verification entity, that the current use condition of the entity satisfies the use requirement conditions attribute.

19. The one or more computer storage media of claim 15, wherein:
   multiple use requirements are defined in the use requirement conditions attribute;
   the current use condition comprises a set of current conditions; and
   the current use condition is verified to satisfy the use requirement conditions attribute by: verifying that the set of current use conditions satisfy the multiple use requirements defined in the use requirement conditions attribute.

20. The one or more computer storage media of claim 15, wherein:
   the use requirement conditions attribute and the current use condition pertain to one or more selected from the following: time, time duration, date, geographic location, virtual location, device type, a number of accesses to the digital content, and a number of users who have accessed the digital content; and
   the digital content comprises one or more selected from the following: audio content, image content, video content, text content, an audio streaming service, an image streaming service, a text streaming service, and a video streaming service.

* * * * *